US012457697B2

(12) United States Patent
Yoon et al.

(10) Patent No.: US 12,457,697 B2
(45) Date of Patent: Oct. 28, 2025

(54) FLEXIBLE DISPLAY, STRUCTURE SUPPORTING THE FLEXIBLE DISPLAY, AND ELECTRONIC DEVICE INCLUDING THE SAME

(71) Applicant: SAMSUNG ELECTRONICS CO., LTD., Suwon-si (KR)

(72) Inventors: Yeonggyu Yoon, Suwon-si (KR); Youngmin Kang, Suwon-si (KR); Moonchul Shin, Suwon-si (KR); Seungjoon Lee, Suwon-si (KR); Joongyeon Cho, Suwon-si (KR); Junyoung Choi, Suwon-si (KR); Myunghoon Kwak, Suwon-si (KR); Yangwook Kim, Suwon-si (KR); Gabseong Lee, Suwon-si (KR); Wonho Lee, Suwon-si (KR); Jookwan Lee, Suwon-si (KR); Junghyeob Lee, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 17/970,134

(22) Filed: Oct. 20, 2022

(65) Prior Publication Data

US 2023/0130795 A1    Apr. 27, 2023

Related U.S. Application Data

(63) Continuation of application No. PCT/KR2022/015398, filed on Oct. 12, 2022.

(30) Foreign Application Priority Data

Oct. 27, 2021    (KR) .................. 10-2021-0144354
Jan. 11, 2022    (KR) .................. 10-2022-0003959

(51) Int. Cl.
*H05K 5/02*    (2006.01)
*H04M 1/02*    (2006.01)

(52) U.S. Cl.
CPC ........ *H05K 5/0217* (2013.01); *H04M 1/0268* (2013.01)

(58) Field of Classification Search
CPC .................. H05K 5/0217; H04M 1/0268; H04M 1/0237; G06F 1/16; G09F 9/30
See application file for complete search history.

(56) References Cited

U.S. PATENT DOCUMENTS 10,904,371 B1 *   1/2021   Song .................. G06F 1/1656
10,955,876 B1     3/2021   Song et al.
(Continued)

FOREIGN PATENT DOCUMENTS

CN            212156402         12/2020
KR       10-2014-0147497         12/2014
(Continued)

OTHER PUBLICATIONS

Search Report and Written Opinion dated Dec. 14, 2022 issued in International Patent Application No. PCT/KR2022/015398.
(Continued)

*Primary Examiner* — Allen L Parker
*Assistant Examiner* — Dakota M Talbert
(74) *Attorney, Agent, or Firm* — Nixon & Vanderhye P.C.

(57) ABSTRACT

An electronic device may include a first housing, a second housing configured to change a position relative to the first housing based on sliding of the first housing, a flexible display including a first area and a bendable or rollable second area extending from the first area, a supporting structure coupled with the flexible display to support at least a portion of the flexible display and including a plurality of bars, and a guide rail configured to guide a movement of the (Continued)

plurality of bars based on the sliding of the first housing. Each of the plurality of bars may include a frame and a header formed on an end of the frame. When the second area of the flexible display is bent or rolled, the headers of adjacent bars may be disposed to at least partially overlap each other. Each of the headers may include at least one pole at least partially received in the guide rail.

20 Claims, 19 Drawing Sheets

(56) References Cited

U.S. PATENT DOCUMENTS

| | | | |
|---|---|---|---|
| 10,963,014 | B1 | 3/2021 | Park et al. |
| 11,012,546 | B1 | 5/2021 | Song et al. |
| 2013/0021762 | A1 | 1/2013 | van Dijk et al. |
| 2014/0380186 | A1 | 12/2014 | Kim et al. |
| 2018/0103550 | A1 | 4/2018 | Seo et al. |
| 2019/0098776 | A1 | 3/2019 | Jeon |
| 2019/0261519 | A1 | 8/2019 | Park et al. |
| 2019/0268455 | A1 | 8/2019 | Baek et al. |
| 2020/0253069 | A1 | 8/2020 | Cha |
| 2021/0200273 | A1 | 7/2021 | Hong et al. |
| 2021/0208629 | A1 | 7/2021 | Jo et al. |

FOREIGN PATENT DOCUMENTS

| | | |
|---|---|---|
| KR | 10-2016-0141255 | 12/2016 |
| KR | 10-2017-0019043 | 2/2017 |
| KR | 10-2018-0039799 | 4/2018 |
| KR | 10-2018-0053985 | 5/2018 |
| KR | 10-2019-0101605 | 9/2019 |
| KR | 10-2021-0074254 | 6/2021 |
| KR | 10-2021-0083442 | 7/2021 |
| KR | 10-2021-0090926 | 7/2021 |
| KR | 10-2022-0040372 | 3/2022 |
| WO | WO 2021/185096 A1 | 9/2021 |

OTHER PUBLICATIONS

Extended European Search Report dated Oct. 1, 2024 for EP Application No. 22887420.2.

* cited by examiner

FLEXIBLE DISPLAY, STRUCTURE SUPPORTING THE FLEXIBLE DISPLAY, AND ELECTRONIC DEVICE INCLUDING THE SAME

CROSS-REFERENCE TO RELATED APPLICATIONS

This application is a continuation of International Application No. PCT/KR2022/015398 designating the United States, filed on Oct. 12, 2022, in the Korean Intellectual Property Receiving Office and claiming priority to Korean Patent Application No. 10-2021-0144354, filed on Oct. 27, 2021, in the Korean Intellectual Property Office, and to Korean Patent Application No. 10-2022-0003959, filed on Jan. 11, 2022, in the Korean Intellectual Property Office, the disclosures of all of which are incorporated by reference herein in their entireties.

BACKGROUND

Field

The disclosure relates to a flexible display and an electronic device including the same.

Description of Related Art

Developing electronic information communication technology integrates various functionalities into a single electronic device or portable communication device. For example, smartphones pack the functionalities of a sound player, imaging device, and scheduler, as well as the communication functionality and, on top of that, may implement more various functions by having applications installed thereon.

As smartphones or other personal/portable communication devices spread, users' demand for portability and use convenience is on the rise. For example, a touchscreen display may not only serve as an output device of visual information but also provide a virtual keyboard that replaces a mechanical input device (e.g., a button input device). As such, portable communication devices or electronic devices may be made compact while delivering further enhanced applicability (e.g., a larger screen). Flexible displays, e.g., foldable or rollable displays, will come in commerce and electronic devices are expected to deliver better portability and use convenience.

In an electronic device including a flexible display extendable by sliding, structures of the electronic device may relatively move (e.g., slide, rotate, or pivot about each other. In this case, some structure (e.g., a first housing and a partial area of the flexible display) may move into or away from another structure (e.g., a second housing).

In the structure extendable according to a slide in the electronic device, for the user's convenience, the flexible display may slide in or out, and a partial area of the flexible display may be bent or rolled. In general, the flexible display may be formed of a stack of several layers, such as thin glasses, films, and pressure sensitive adhesive (PSA) layers.

The flexible display may not withstand the tensile or compressive stress applied thereto when the flexible display is partially bent (or rolled) or flattened and its layer may peel off. For example, in a flexible display in which a plurality of layers are stacked, it is inevitable that tensile and/or compressive stresses are applied to the layers in different shear directions. The pressure in the shear direction may be applied to some layers of the flexible display to which a plurality of bars are attached, due to the tensile and/or compressive stresses, and the pressure may cause some of the layers to buckle.

SUMMARY

Embodiments of the disclosure, provide an apparatus in which when the flexible display slides in or out, rotation of the plurality of bars when the flexible display is bent may be restrained and, as the bending portion is circled, the flexible display may be prevented/reduced from peeling off and buckling.

According to various example embodiments of the disclosure, an electronic device may comprise: a first housing, a second housing configured to change a position relative to the first housing based on sliding with respect to the first housing, a flexible display including a first area and a bendable or rollable second area extending from the first area, a supporting structure coupled with the flexible display to support at least a portion of the flexible display and including a plurality of bars, and a guide rail configured to guide a movement of the plurality of bars based on sliding of the first housing. Each of the plurality of bars may include: a frame and a header formed on an end of the frame. When the second area of the flexible display is bent or rolled, the headers of the at least two or more adjacent bars may be disposed to at least partially overlap each other. Each of the headers may include at least one pole at least partially received in the guide rail.

According to various example embodiments of the disclosure, an electronic device may comprise: a first housing, a second housing receiving at least a portion of the first housing and configured to guide sliding of the first housing, a flexible display including a first area and a bendable or rollable second area extending from the first area, a supporting structure supporting at least a portion of the flexible display and including a plurality of bars whose relative position is changed based on the bending or rolling, and a guide rail configured to guide a slide of the plurality of bars and surround at least some of the plurality of bars. When the flexible display is bent or rolled, adjacent bars among the plurality of bars of the supporting structure may be disposed to at least partially overlap and support each other. The plurality of bars may include a plurality of poles configured to slide along the guide rail to restrain rotation of each bar.

According to various example embodiments, there may be provided an electronic device that allows for stable relative movements of housings and a slide-in/out of the flexible display.

According to various example embodiments, in the electronic device, the supporting structure (including, e.g., a plurality of bars), which supports the flexible display may restrain the tensile and/or compressive stress in the shear direction between the plurality of layers when the flexible display is bent (or rolled), thereby preventing/reducing the flexible display from peeling off and buckling.

According to various example embodiments, in the supporting structure (including, e.g., a plurality of bars) supporting the flexible display in the electronic device, the plurality of bars support each other, restraining rotation of each bar and remaining spaced apart from each other at a predetermined gap. Thus, as the flexible display is bent (or rolled), the bending area may be formed to be circled.

According to various example embodiments, the supporting structure (including, e.g., a plurality of poles) supporting the flexible display in the electronic device is formed to be surrounded by a guide rail and, as the plurality of poles are moved along the guide rail, the flexible display may be guided to be stably moved.

Effects of the disclosure are not limited to the foregoing, and other unmentioned effects would be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
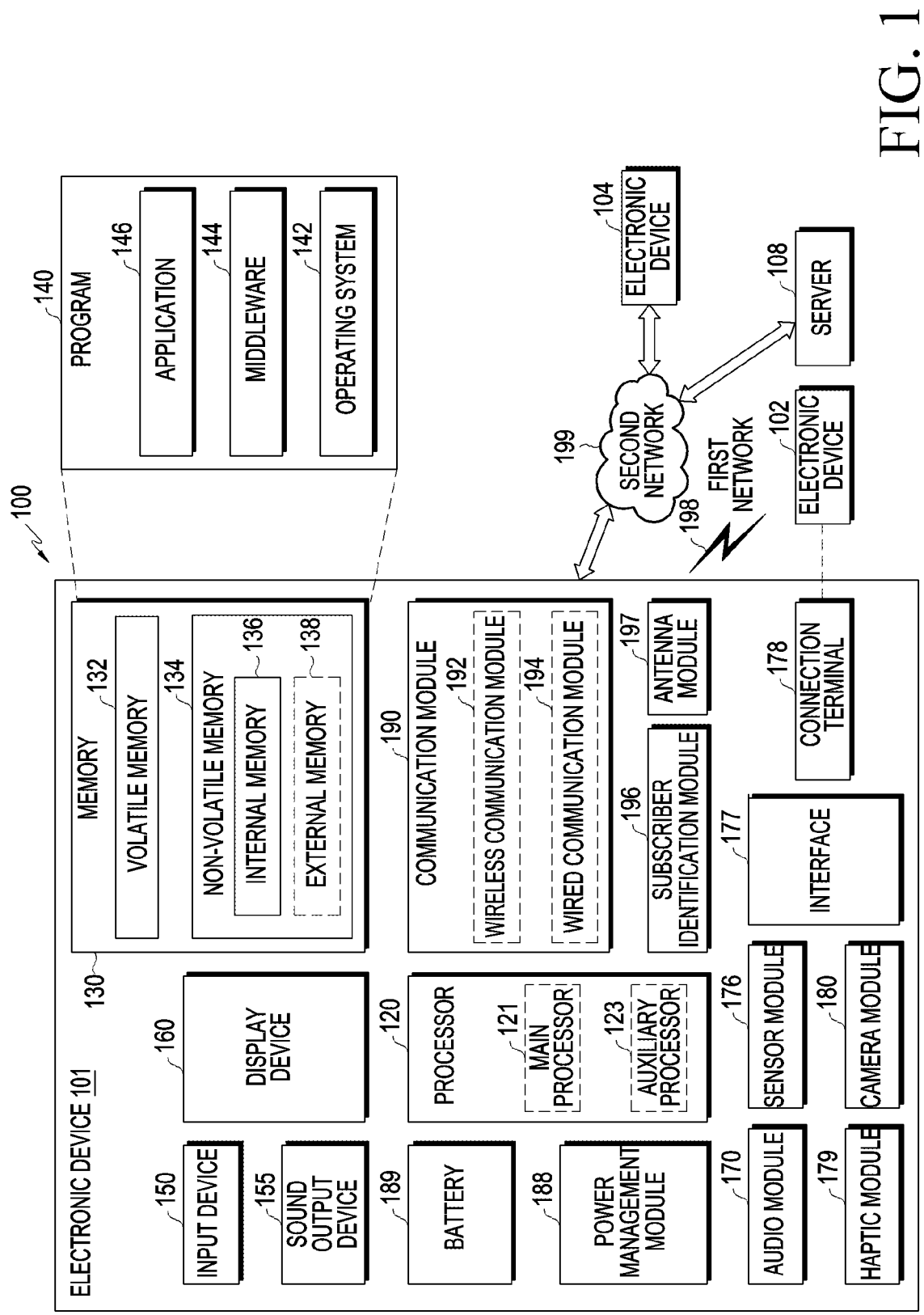
FIG. 1 is a block diagram illustrating an example electronic device in a network environment according to various embodiments.

FIG. 1 is a block diagram illustrating an example electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2:
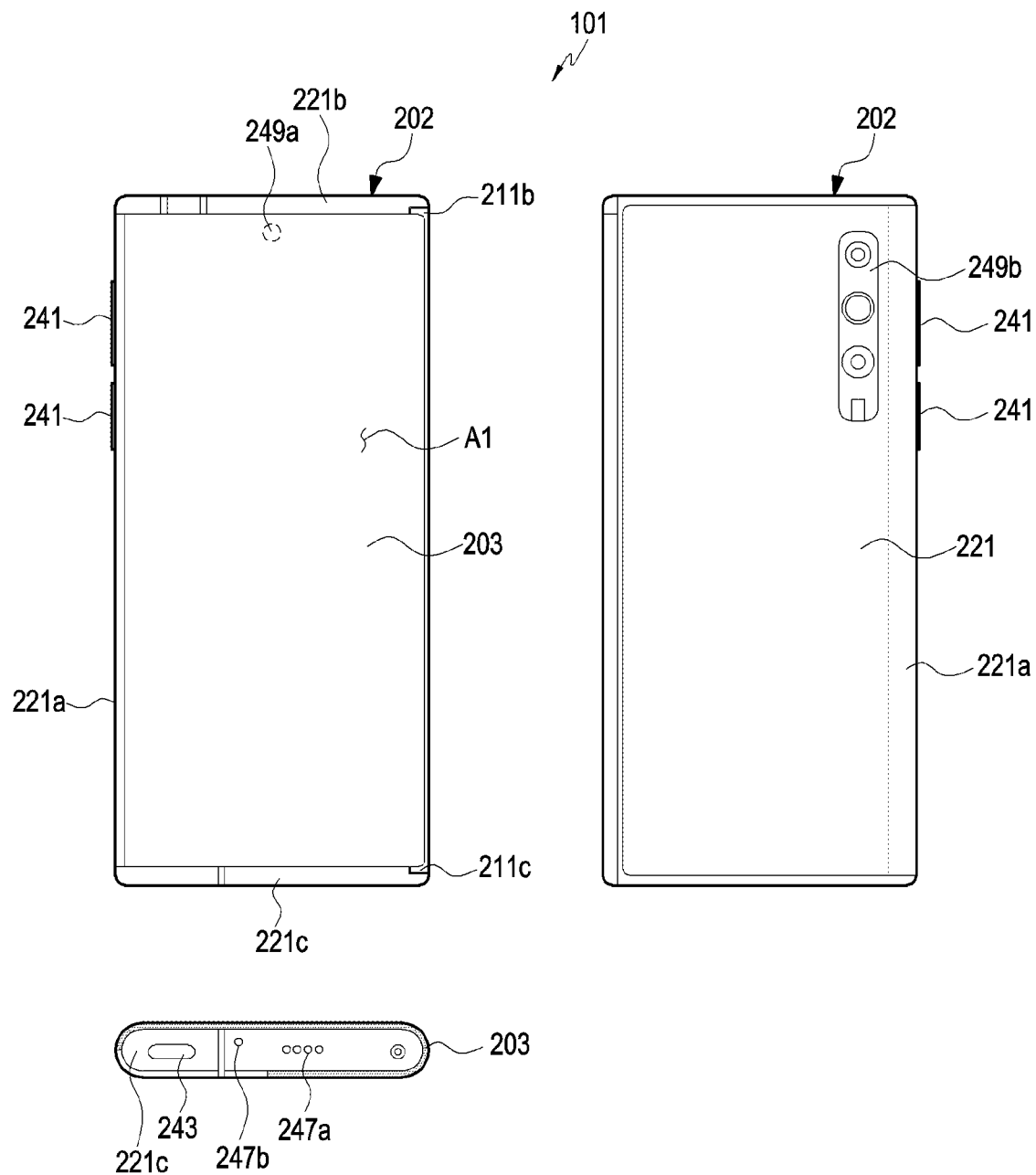
FIG. 2 is a view illustrating a state in which a second display area of a flexible display is received in a second housing, according to various embodiments.
Figure 3:
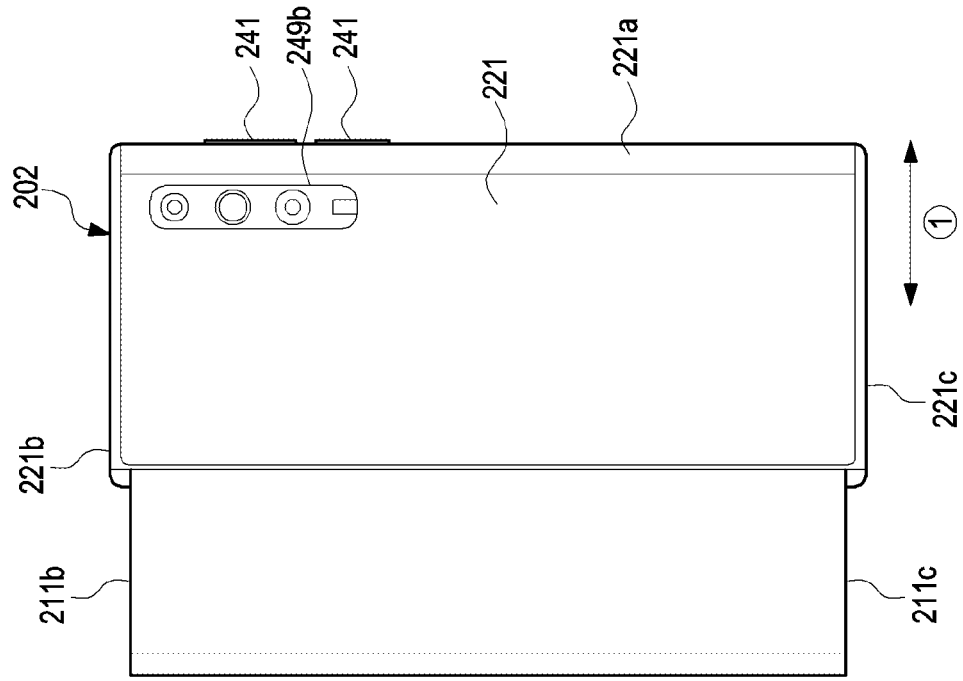
FIG. 3 is a view illustrating a state in which a second display area of a flexible display is extended and visible to the outside of a second housing, according to various embodiments.
Figure 3:
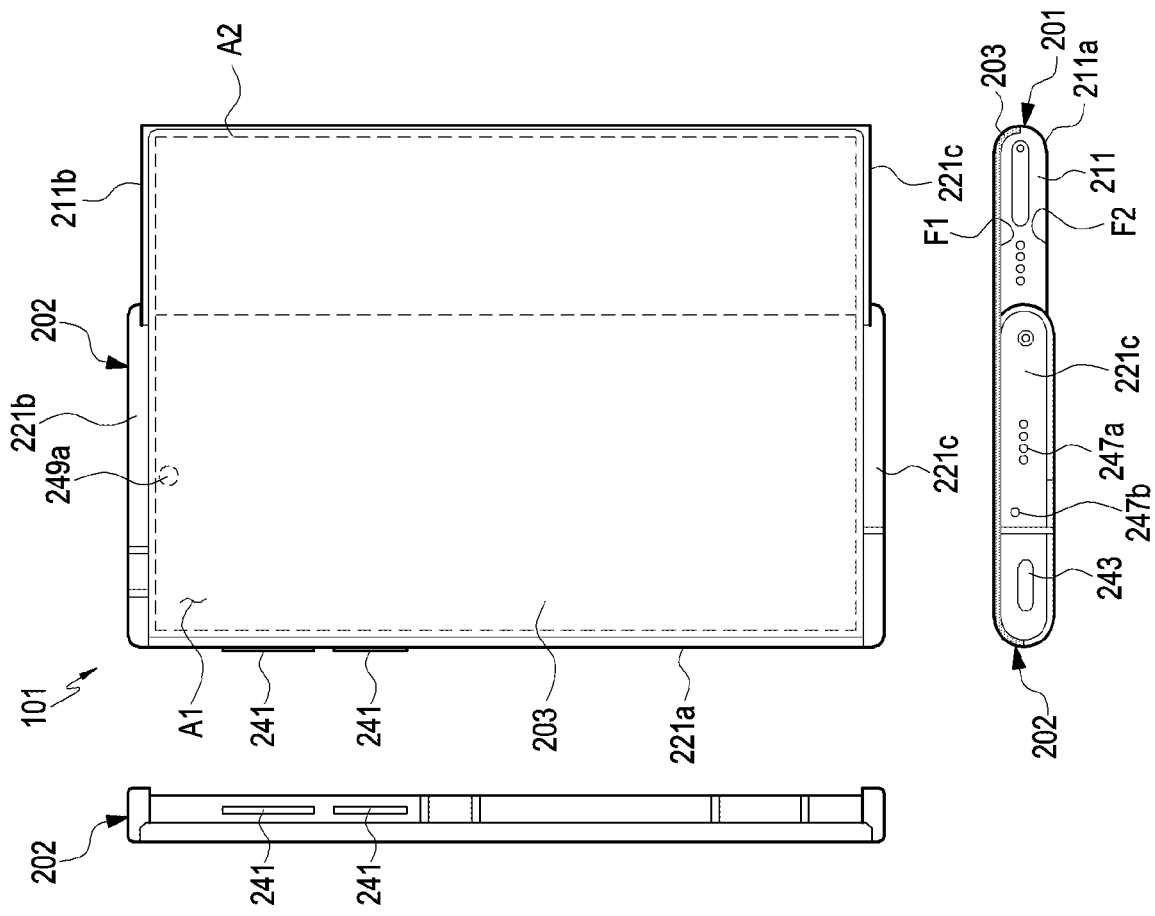

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. FIG. 2 is a view illustrating a state in which a second display area of a flexible display is received in a second housing, according to various embodiments. FIG. 3 is a view illustrating a state in which a second display area of a flexible display is extended to be visible to the outside of a second housing, according to various embodiments.

FIGS. 2 and 3 illustrate a structure in which the display 203 (e.g., flexible display) is extended to the right when the electronic device 101 is viewed from the front. However, the extending direction of the display 203 is not limited to one direction (e.g., left direction), but design changes may be made so that the display 203 is extendable to the left and/or in two directions.

The state shown in FIG. 2 may be defined as a first housing 201 being closed with respect to a second housing 202, and the state shown in FIG. 2 may be defined as the first housing 201 being open with respect to the second housing 202. According to an embodiment, the "closed state" or "opened state" may be defined as a closed or open state of the electronic device.

Referring to FIGS. 2 and 3, the electronic device 101 may include housings 201 and 202. The housings 201 and 202 may include a second housing 202 and a first housing 201 movably disposed with respect to the second housing 202.

According to an embodiment, the electronic device 101 may be interpreted as having a structure in which the second housing 202 is slidably disposed on the first housing 201. According to an embodiment, the first housing 201 may be disposed to perform reciprocating motion by a predetermined distance in the shown direction with respect to the second housing 202. The configuration of the electronic device 101 of FIGS. 2 and 3 may be identical in whole or part to the configuration of the electronic device 101 of FIG. 1.

According to an embodiment, the first housing 201 may be referred to as, for example, a first structure, a slide unit, or a slide housing, and may be disposed to reciprocate on the second housing 202. According to an embodiment, the first housing 201 may receive various electrical/electronic components, such as a circuit board or a battery. The second housing 202 may be referred to as, e.g., a second structure, a main part, or a main housing, and may guide the movement of the first housing 101. A portion (e.g., the first display area A1) of the display 203 may be seated on the first housing 201. According to an embodiment, another portion (e.g., the second display area A2) of the display 203 may be received into the inside of the second housing 202 (e.g., a slide-in operation) or be exposed or visible to the outside of the second housing 202 (e.g., a slide-out operation) as the first housing 201 moves (e.g., slides) with respect to the second housing 202. According to an embodiment, a motor, a speaker, a sim socket, and/or a sub circuit board electrically connected with a main circuit board may be disposed in the first housing 201. A main circuit board on which electrical components, such as an application processor (AP) and a communication processor (CP) are mounted may be disposed in the second housing 202.

According to various embodiments, the first housing 201 may include a first plate 211 (e.g., a slide plate). The first plate 211 may include a first surface (e.g., the first surface F1 of FIG. 3) forming at least a portion of the first plate 211 and a second surface F2 facing away from the first surface F1. According to an embodiment, the first plate 211 may support at least a portion of the display 203 (e.g., the first display area A1). According to an embodiment, the first housing 201 may include a first plate 211, a 1-1th sidewall 211a extending from the first plate 211, a 1-2th sidewall 211b extending from the 1-1th sidewall 211a and the first plate 211, and a 1-3th sidewall 211c extending from the 1-1th sidewall 211a and the first plate 211 and positioned substantially parallel to the 1-2th sidewall 211b.

According to various embodiments, the second housing 202 may include a second plate 221 (e.g., main case), a 2-1th sidewall 221a extending from the second plate 221, a 2-2th sidewall 221b extending from the 2-1th sidewall 221a and the second plate 221, and a 2-3th sidewall 221c extending from the 2-1th sidewall 221a and the second plate 221 and disposed substantially parallel to the 2-2th sidewall 221b. According to an embodiment, the 2-2th sidewall 221b and the 2-3th sidewall 221c may be formed substantially perpendicular to the 2-1th sidewall 221a. According to an embodiment, the second plate 221, the 2-1th sidewall 221a, the 2-2nd sidewall 221b, and the 2-3th sidewall 221c may be formed to have an opening in one surface (e.g., the front surface) to receive at least a portion of the first housing 201. For example, the first housing 201 may be coupled to the second housing 202 in a state in which it is at least partially surrounded, and the first housing 201 may be slideslid in a direction parallel to the first surface F1 or the second surface F2, for example, direction ① indicated with the arrow. According to an embodiment, the second plate 221, the 2-1th sidewall 221a, the 2-2th sidewall 221b, and/or the 2-3th sidewall 221c may be integrally formed. According to an embodiment, the second plate 221, the 2-1th sidewall 221a, the 2-2th sidewall 221b, and/or the 2-3th sidewall 221c may be formed as separate housings and be combined or assembled.

According to various embodiments, the second plate 221 and/or the 2-1th sidewall 221a may cover at least a portion of the display 203. For example, at least a portion of the display 203 may be received in the second housing 202. The second plate 221 and/or the 2-1th sidewall 221a may cover a portion of the flexible display 203 received in the second housing 202.

According to various embodiments, the first housing 201 may be moved into an opened state and closed state with respect to the second housing 202 in a first direction (e.g., direction ①) parallel to the 2-2th sidewall 221b or the 2-3th sidewall 221c. The first housing 201 may be moved to be positioned at a first distance from the 2-1th sidewall 221a in the closed state. In the opened state, the first housing 201 may be moved to be positioned at a second distance greater than the first distance from the 2-1th sidewall 221a. In various embodiments, in the closed state, the first housing 201 may surround a portion of the 2-1th sidewall 221a.

According to various embodiments, the electronic device 101 may include a display 203, a key input device 241, a connector hole 243, audio modules 247a and 247b, or camera modules 249a and 249b. Although not shown, the electronic device 101 may further include an indicator (e.g., a light emitting diode (LED) device) or various sensor modules. The configuration of the display 203, audio module 247a and 247b, and camera modules 249a and 249b of FIGS. 2 and 3 may be identical in whole or part to the configuration of the display module 160, the audio module 170, and the camera module 180 of FIG. 1.

According to various embodiments, the display 203 may include a first display area A1 and a second display area A2. According to an embodiment, the first display area A1 may be disposed on the second housing 202. The second display area A2 may extend from the first display area A1 and, as the first housing 201 slides, the second display area A2 may be inserted or received in the second housing 202 (e.g., structure) or exposed or visible to the outside of the second housing 202.

According to various embodiments, the second display area A2 may be substantially moved while being guided by an area (e.g., the curved surface 250 of FIG. 4) of the first housing 201 and may be thus received in, or exposed or visible to the outside of, the second housing 202 or a space formed between the first housing 201 and the second housing 202. According to an embodiment, the second display area A2 may move based on a slide of the first housing 201 in the first direction (e.g., the direction indicated by the arrow C)). For example, while the first housing 201 slides, a portion of the second display area A2 may be deformed into a curved shape in a position corresponding to the curved surface 250 of the first housing 201.

According to various embodiments, when viewed from above the first plate 211 (e.g., slide plate), if the first housing 201 moves from the closed state to the opened state, the second display area A2 may be exposed or visible to the outside of the second housing 202 to be substantially coplanar with the first display area A1. The display 203 may be disposed to be coupled with, or adjacent, a touch detecting circuit, a pressure sensor capable of measuring the strength (pressure) of touches, and/or a digitizer for detecting a magnetic field-type stylus pen. In an embodiment, the second display area A2 may be at least partially received inside the second housing 202, and a portion of the second display area A2 may be visually exposed to the outside even in the state shown in FIG. 2 (e.g., the closed state). According to an embodiment, irrespective of the closed state or the opened state, the exposed or visible portion of the second display area A2 may be positioned on a portion (e.g., the curved surface 250 of FIG. 4) of the first housing 201, and a portion of the second display area A2 may remain in the curved shape in the position corresponding to the curved surface 250.

According to one of various embodiments, the electronic device 200 may include at least one hinge structure. The hinge structure may connect the first housing 201 with the second housing 202. For example, the hinge structure may be connected to the first plate 211 and the second plate 221. According to an embodiment, the hinge structure 240 may transfer a driving force for guiding the slide of the first housing 201 to the first housing 201. For example, the hinge structure may include an elastic material (e.g., a spring) and, based on the slide of the first housing 201, provide an elastic force in the first direction (e.g., direction ① of FIG. 3). According to an embodiment, the hinge structure may be excluded.

According to various embodiments, the key input device 241 may be positioned in one area of the first housing 201. Depending on the appearance and the state of use, the electronic device 101 may be designed to omit the illustrated key input device 241 or to include additional key input device(s). According to an embodiment, the electronic device 101 may include a key input device (not shown), e.g., a home key button or a touchpad disposed around the home key button. According to an embodiment, at least a portion of the key input device 241 may be disposed on the 2-1th sidewall 221a, the 2-2th sidewall 221b, or the 2-3th sidewall 221c of the second housing 202.

According to various embodiments, the connector hole 243 may be omitted or may receive a connector (e.g., a universal serial bus (USB) connector) for transmitting and receiving power and/or data with an external electronic device. Although not shown, the electronic device 101 may include a plurality of connector holes 243, and some of the plurality of connector holes 243 may function as connector holes for transmitting/receiving audio signals with an external electronic device. In the illustrated embodiment, the connector hole 243 is disposed in the 2-3th sidewall 123c but is not limited thereto. The connector hole 243 or a connector hole not shown may be disposed in the 2-1th sidewall 221a or the 2-2th sidewall 221b.

According to various embodiments, the audio modules 247a and 247b may include at least one speaker hole 247a or at least one microphone hole 247b. One of the speaker holes 247a may be provided as a receiver hole for voice calls, and the other may be provided as an external speaker hole. The electronic device 101 may include a microphone for obtaining sound. The microphone may obtain external sound of the electronic device 101 through the microphone hole 247b. According to an embodiment, the electronic device 101 may include a plurality of microphones to detect the direction of sound. According to an embodiment, the electronic device 101 may include an audio module in which the speaker hole 247a and the microphone hole 247b are implemented as one hole or may include a speaker without the speaker hole 247a (e.g., a piezo speaker).

According to various embodiments, the camera modules 249a and 249b may include a first camera module 249a and a second camera module 249b. The second camera module 249b may be positioned in the first housing 201 and may capture a subject in a direction opposite to the first display area A1 of the display 203. The electronic device 101 may include a plurality of camera modules 249a and 249b. For example, the electronic device 101 may include at least one of a wide-angle camera, a telephoto camera, or a close-up camera. According to an embodiment, the electronic device 200 may measure the distance to the subject by including an infrared projector and/or an infrared receiver. The camera modules 249a and 249b may include one or more lenses, an image sensor, and/or an image signal processor. The first camera module 249a may be disposed to face in the same direction as the display 203. For example, the first camera module 249a may be disposed in an area overlapping the display 203 or around the first display area A1 and, when disposed in the area overlapping the display 203, the first camera module 249a may capture the object through the display 203. According to an embodiment, the first camera module 249a may include an under display camera (UDC) that has a screen display area (e.g., the first display area A1) that may not be visually exposed but hidden.

According to various embodiments, an indicator (not shown) of the electronic device 101 may be disposed on the first housing 201 or the second housing 202, and the indicator may include a light emitting diode to provide state information about the electronic device 101 as a visual signal. The sensor module (not shown) of the electronic device 101 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to an embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
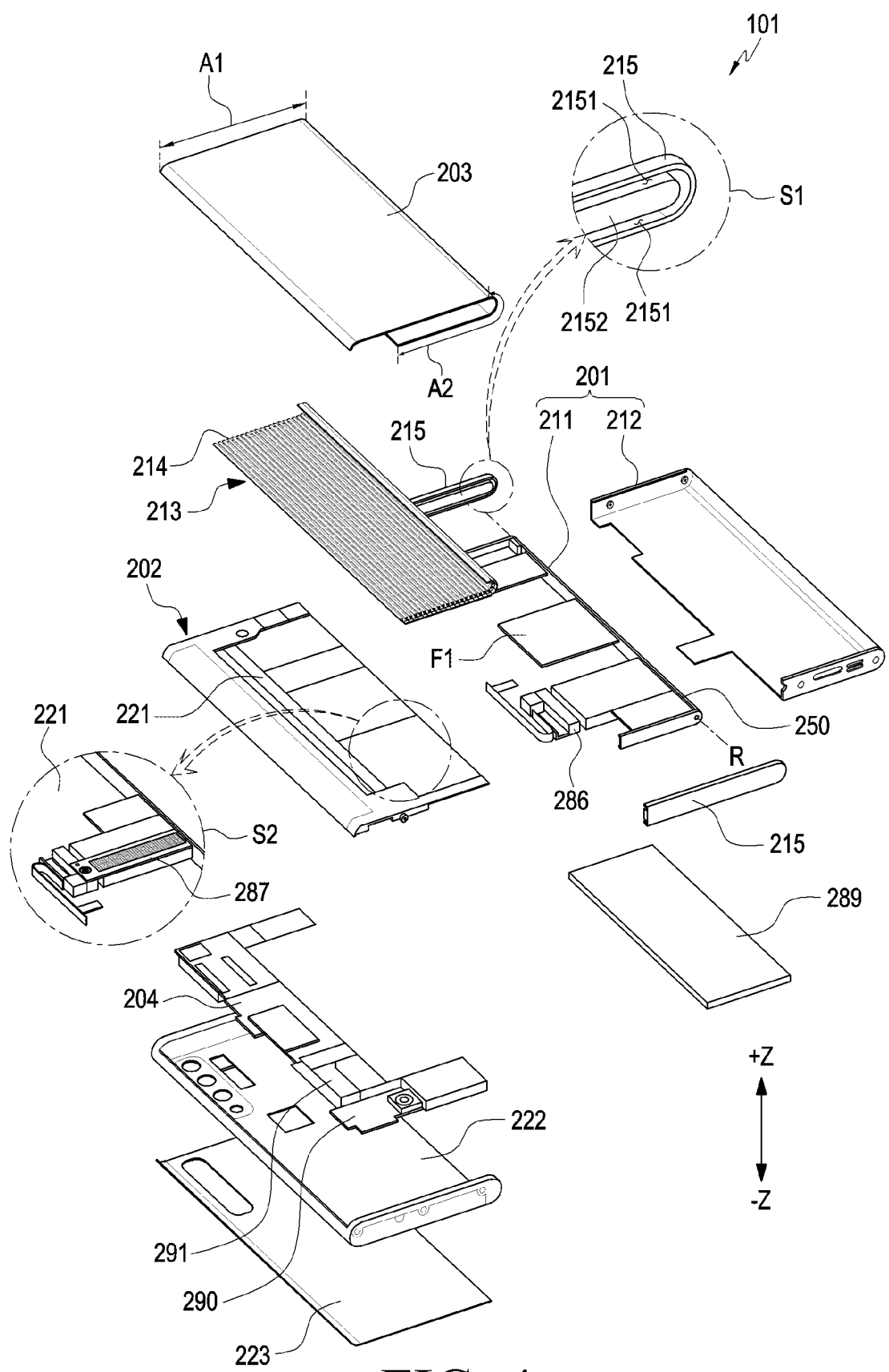
FIG. 4 is an exploded perspective view illustrating an electronic device according to various embodiments.

FIG. 4 is an exploded perspective view illustrating an electronic device according to various embodiments.

Referring to FIG. 4, the electronic device 101 may include a first housing 201, a second housing 202, a display 203 (e.g., a flexible display, a foldable display, or a rollable display), and/or an articulated hinge structure 213. A portion (e.g., the second display area A2) of the display 203 may be received in the electronic device 101 along the curved surface 250 of the first housing 201.

The configuration of the first housing 201, the second housing 202, and the display 203 of FIG. 4 may be identical in whole or part to the configuration of the first housing 201, the second housing 202, and the display 203 of FIGS. 2 and 3.

According to various embodiments, the first housing 201 may include a first plate 211 and a slide cover 212. The first plate 211 and the slide cover 212 may be mounted (e.g., at least partially connected) on the second housing 202 and be reciprocated in one direction while being guided by the second housing 202. According to an embodiment, the first plate 211 may support the display 203. For example, the first plate 211 may include a first surface F1. The first display area A1 of the display 203 may be substantially positioned on the first surface F1 to maintain a flat panel shape. The slide cover 212 may protect the display 203 positioned on the first plate 211. For example, at least a portion of the display 203 may be positioned between the first plate 211 and the slide cover 212. According to an embodiment, the first plate 211 and the slide cover 212 may be formed of a metal material and/or a non-metal (e.g., polymer) material. According to an embodiment, the first plate 211 may receive at least some (e.g., the battery 289 (e.g., the battery 189 of FIG. 1), motor 286, and rack 287) of the components of the electronic device 101.

According to various embodiments, the articulated hinge structure 213 may be connected with the first housing 201. For example, the articulated hinge structure 213 may be positioned between the first plate 211 and the slide cover 212. According to an embodiment, as the first housing 201 slides, the articulated hinge structure 213 may move with respect to the second housing 202. In the closed state (e.g., FIG. 2) of the articulated hinge structure 213, most of the structure may be received in the second housing 202. According to an embodiment, at least a portion of the articulated hinge structure 213 may move corresponding to the curved surface 250 positioned at the edge of the first housing 201.

According to various embodiments, the articulated hinge structure 213 may include a plurality of bars or rods 214 and a guide rail 215. The plurality of rods 214 may extend in a straight line and be disposed parallel to the rotational axis R formed by the curved surface 250, and the plurality of rods 214 may be arranged along a direction substantially perpendicular to the rotational axis R (e.g., the direction along which the first housing 201 slides).

According to various embodiments, the guide rail 215 may guide the movement of the plurality of rods 214. The guide rail 215 may include an upper guide rail coupled with an upper end of the first plate 211 and connected with upper ends of the plurality of rods 214 and a lower guide rail coupled with a lower end of the first plate 211 and connected with lower ends of the plurality of rods 214. According to an embodiment, referring to a first enlarged area S1, when the plurality of rods 214 are bent or slid while moving along the curved surface 250, the upper ends and/or lower ends of the plurality of rods 214 may be moved while remaining fitted into the guide rail 215. For example, the plurality of rods 214 may be slid along the groove-shape rail 2151 formed inside the guide rail 215, with their upper ends and/or lower ends fitted into the rail 2151.

According to an embodiment, as the motor 286 is driven (e.g., driven to slide out the display), the first plate 211 where the motor 286 is disposed may slide out, and a protrusion 2152 inside the guide rail 215 may push out the upper ends and/or lower ends of the plurality of rods 214 bent. Accordingly, the display 203 received between the first plate 211 and the slide cover 212 may be expanded to the front. According to an embodiment, as the motor 286 is driven (e.g., driven to slide in the display), the first plate 211 where the motor 286 is disposed may be slid in, and the outer portion (e.g., a portion other than the protrusion 2152) of the guide rail 215 may push out the upper and/or lower ends of the plurality of rods 214 bent. Accordingly, the expanded display 203 may be received between the first plate 211 and the slide cover 212.

According to an embodiment, the rack 287 may be disposed in the second housing 202 and guide the slide of the first housing 201 and the display 203. The second enlarged area S2 represents the rear surface (e.g., the surface facing the −Z axis) of the second plate 221. Referring to the second enlarged area S2, the rack 287 may be fixedly disposed on one surface (e.g., one surface facing the −Z axis) of the second plate 221 of the second housing 202 and may guide the gear connected to the driving motor 286 to move while rotating in the sliding direction.

According to various embodiments, the second housing 202 may include a second plate 221, a second plate cover 222, and a third plate 223. The second plate 221 may overall support the electronic device 101. The first plate 211 may be disposed on one surface of the second plate 221, and the printed circuit board 204 may be coupled to the other surface of the second plate 221. According to an embodiment, the second plate 221 may receive components (e.g., the battery 289 (e.g., the battery 189 of FIG. 1) and the circuit board 204) of the electronic device 101. The third plate cover 222 may protect various components positioned on the second plate 221.

According to various embodiments, a plurality of circuit boards may be received in the second housing 202. A processor, memory, and/or interface may be mounted on the circuit board 204 which is the main board. The processor may include one or more of, e.g., a central processing unit, an application processor, a graphic processing device, an image signal processing, a sensor hub processor, or a communication processor. According to various embodiments, the circuit board 204 may include a flexible printed circuit board type radio frequency cable (FRC). For example, the circuit board 204 may be disposed on at least a portion of the second plate 221 and may be electrically connected with an antenna module (e.g., the antenna module 197 of FIG. 1) and a communication module (e.g., the communication module 190 of FIG. 1).

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to various embodiments, the electronic device 101 may further include a separate sub circuit board 290 spaced apart from the circuit board 204 in the second housing 202. The sub circuit board 290 may be electrically connected with the circuit board 204 through the flexible circuit board 291. The sub circuit board 290 may be electrically connected with electrical components disposed in an end area of the electronic device, such as the battery 289 or a speaker and/or a sim socket, and may transfer signals and power.

According to an embodiment, the battery 289 may be a device for supplying power to at least one component of the electronic device 101. The battery 289 may include, e.g., a primary cell which is not rechargeable, a secondary cell which is rechargeable, or a fuel cell. At least a portion of the battery 289 may be disposed on substantially the same plane as the circuit board 204. The battery 289 may be integrally or detachably disposed inside the electronic device 101.

According to an embodiment, the battery 289 may be formed of a single embedded battery or may include a plurality of removable batteries. For example, when the embedded battery is positioned on the first plate 211, the embedded battery may move as the first plate 211 slides.

According to various embodiments, the third plate 223 may substantially form at least a portion of the exterior of the second housing 202 or the electronic device 101. For example, the third plate 223 may be coupled to the outer surface of the second plate cover 222. According to an embodiment, the third plate 223 may be integrally formed with the second plate cover 222. According to an embodiment, the third plate 223 may provide a decorative effect on the exterior of the electronic device 101. The second plate 221 and the second plate cover 222 may be formed of at least one of a metal or a polymer, and the third plate 223 may be formed of at least one of metal, glass, synthetic resin or ceramic. According to an embodiment, the second plate 221, the second plate cover 222 and/or the third plate 223 may be formed of a material that transmits light at least partially (e.g., the auxiliary display area). For example, in a state in which a portion of the display 203 (e.g., the second display area A2) is received in the electronic device 101, the electronic device 101 may output visual information using the second display area A2. The auxiliary display area may be a portion of the second plate 221, the second plate cover 222, and/or the third plate 223 in which the display 203 received in the second housing 202 is positioned.

Figure 5:
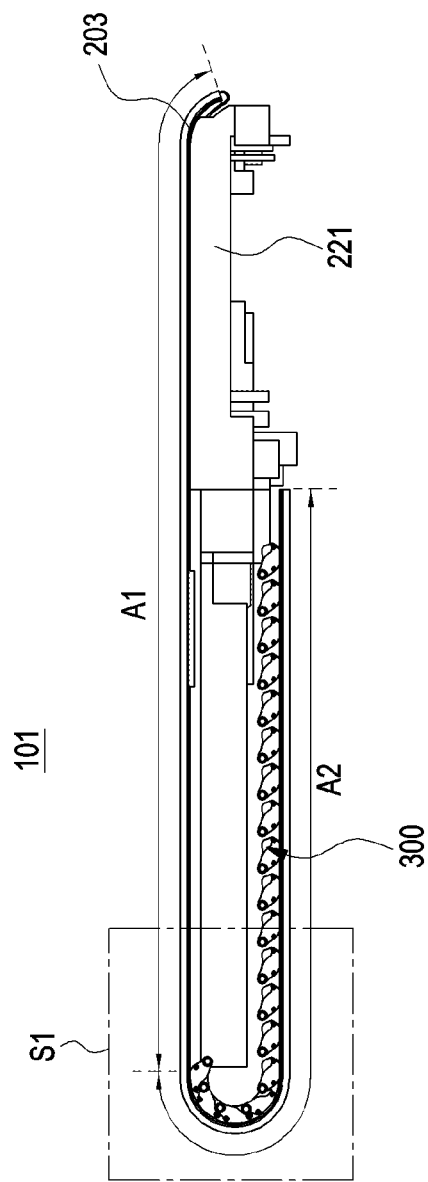
FIG. 5 is a cross-sectional view illustrating a structure in which a portion of a second housing is excluded in a closed state of an electronic device according to various embodiments.

FIG. 5 is a cross-sectional view illustrating a structure in which a portion of a second housing is excluded in a closed state of an electronic device according to various embodiments.

Figure 6:
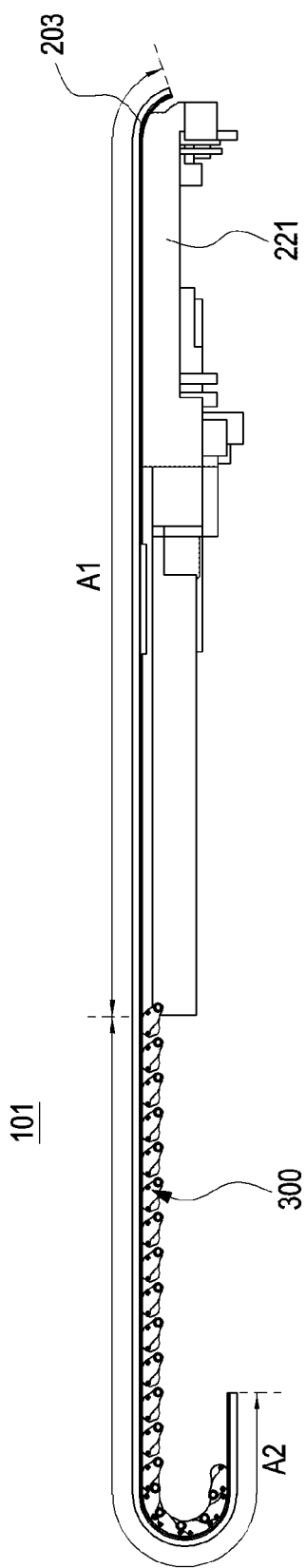
FIG. 6 is a cross-sectional view illustrating a structure in which a portion of a second housing is excluded in an opened state of an electronic device according to various embodiments.

FIG. 6 is a cross-sectional view illustrating a structure in which a portion of a second housing is excluded in an opened state of an electronic device according to various embodiments.

Figure 7:
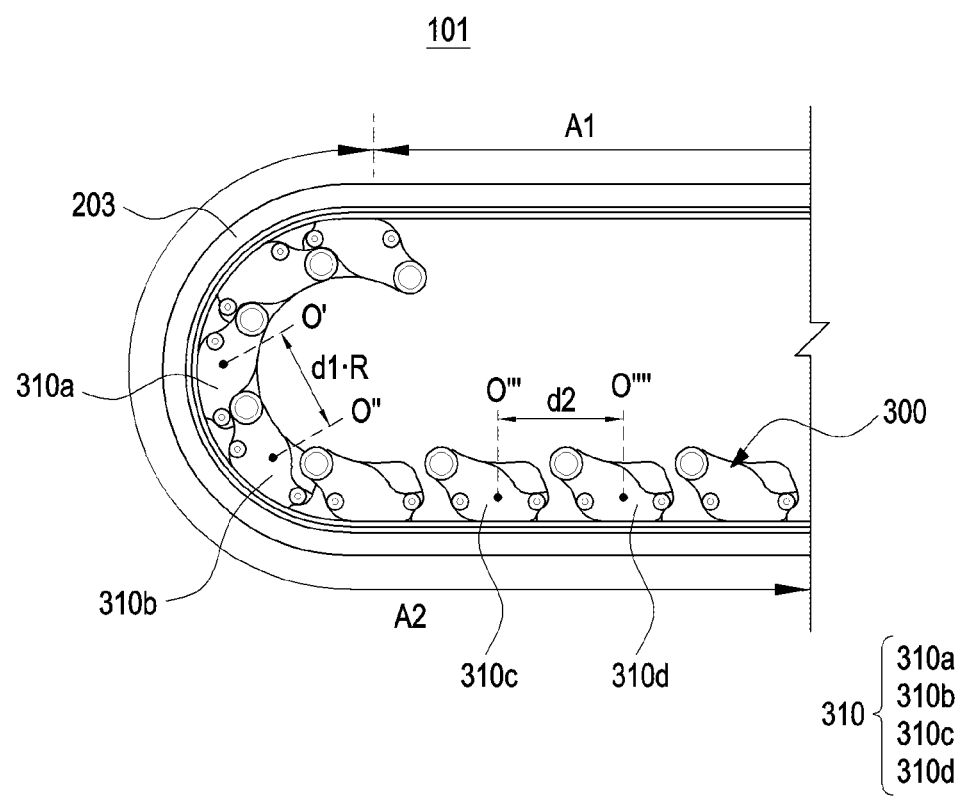
FIG. 7 is an enlarged cross-sectional view illustrating at least a portion of area S1 in FIG. 5 according to various embodiments.

FIG. 7 is an enlarged cross-sectional view illustrating at least a portion of area S1 in FIG. 5 according to various embodiments.

Figure 8:
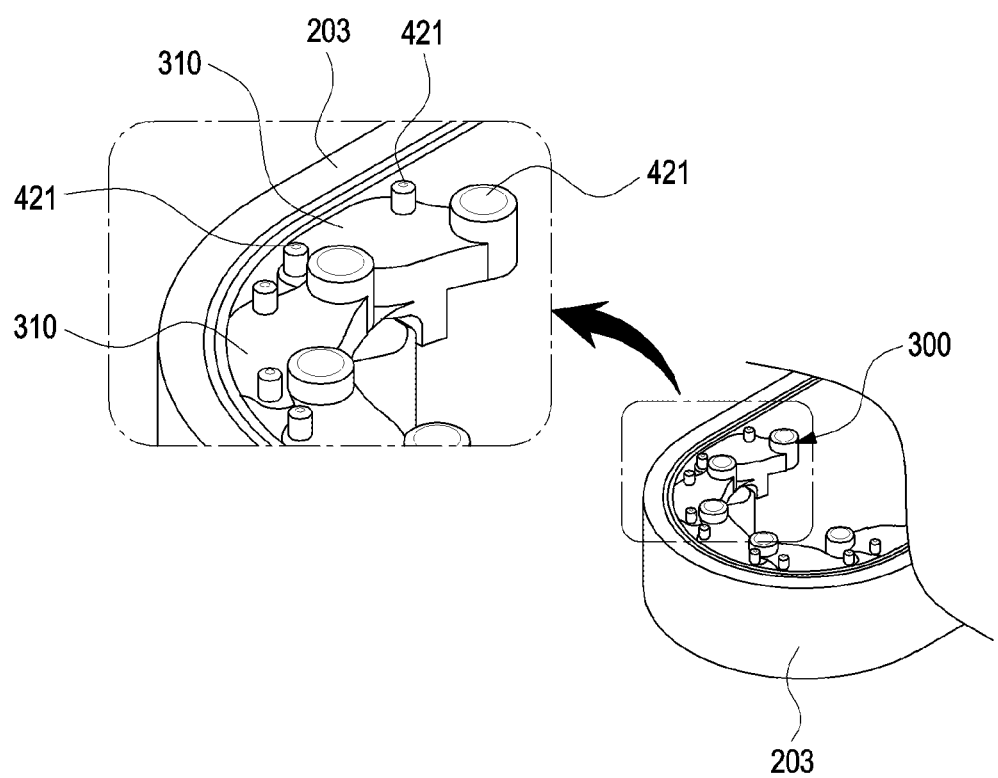
FIG. 8 is an enlarged perspective view illustrating a portion of a supporting structure supporting a display according to various embodiments.

FIG. 8 is an enlarged perspective view illustrating a portion of a supporting structure supporting a display according to various embodiments.

According to various embodiments, the electronic device 101 may include a second plate 221, a display 203, and a supporting structure 300. The configuration of the second plate 221, the display 203, and the supporting structure 330 of FIGS. 5, 6, 7 and 8 may be identical in whole or part to the configuration of the second plate 221, the display 203, and the articulated hinge structure 213 of FIG. 4.

According to various embodiments, as the supporting structure 300 and the display 203 (e.g., flexible display) connected with the supporting structure 300 slide in/out about the second plate 221, the electronic device 101 may turn into the closed state or opened state.

According to various embodiments, the electronic device 101 may provide a supporting structure 300 capable of seamlessly performing the slide-in/slide-out operation. For example, when the display 203 slides in/out, a flat area may turn into a bent (or rolled) area, or a bent (or rolled) area may turn into a flat area. When the transformable area of the display 203, including a plurality of layers, slides in/out, a different magnitude of force (e.g., tensile and/or compressive stress in the shear direction) may be applied to each layer of the display 203. To prevent/reduce the layers of the display from peeling off, the supporting structure 300 may overall support the display 203 while guiding the bending (or rolling) area to be circled.

According to various embodiments, the supporting structure 300 may include a plurality of bars 310 that support at least a portion of the display 203 and change their relative positions according to bending (or rolling). The plurality of bars 310 may be disposed parallel to each other with respect to the rotation axis R and may slide in response to the slide of the display 203. As the display 203 slides, the plurality of bars 310 may be arranged to form a curved shape or may be arranged to form a flat shape. For example, as the first housing 203 slides, a portion of the articulated hinge structure 213 facing the curved surface 250 may form a curved surface, and another portion of the articulated hinge structure 213 that does not face the curved surface 250 may form a flat surface.

According to various embodiments, the second display area A2 of the display 203 may be mounted or supported on the supporting structure 300, and in the slide-out state (e.g., FIG. 6) of the display 203, at least a portion of the second display area A2, along with the first display area A1, may be exposed or visible to the outside. In the state in which the second display area A2 is exposed or visible to the outside, the supporting structure 300 may substantially form a flat surface, thereby supporting or maintaining the second display area A2 in the flat state. According to an embodiment, the combination of the plurality of bars 310 may be replaced with a bendable integral supporting member (not shown).

According to various embodiments, as the display 203 slides, each bar 310 may pivot around another adjacent bar 310 while remaining parallel with the other adjacent bar 310. According to an embodiment, when first ends (e.g., the heads 420 of FIG. 9) of the plurality of bars 310 are viewed, the center of each bar 310 (e.g., the center of the header 420) may remain apart from the center of its adjacent bar 310 by a designated gap. For example, when a first distance between the respective centers O' and O" of a first bar 310a and a second bar 310b adjacent to each other in the plurality of bars 310 supporting the bent area of the display 203 is defined as d1, and a second distance between the respective centers O''' and O'''' of a third bar 310c and a fourth bar 310d adjacent to each other in the plurality of bars 310 supporting the flat area of the display 203 is defined as d2, the first distance d1 and the second distance d2 may be identical to each other.

According to various embodiments, as the display 203 slides, the end of each bar 310 and the end of the adjacent bar 310 may overlap or be spaced apart from each other. For example, in the plurality of bars 310 supporting the bent area of the display 203, portions of the respective first ends of the first bar 310a and the second bar 310b adjacent to each other may contact each other. The first bar 310a and the second bar 310b whose portions contact each other may provide self-support to each other in the bending range. For example, the respective first ends of the third bar 310c and the fourth bar 310d adjacent to each other in the plurality of bars 310 supporting the flat area of the display 230 may be spaced apart from each other.

According to various embodiments, each of the plurality of bars 310 may include a plurality of poles 421 protruding outward. The plurality of poles 421 may restrain rotation between adjacent bars 310 while sliding along the guide rail 215. The plurality of poles 421 are described below in detail with reference to the drawings.

Figure 9:
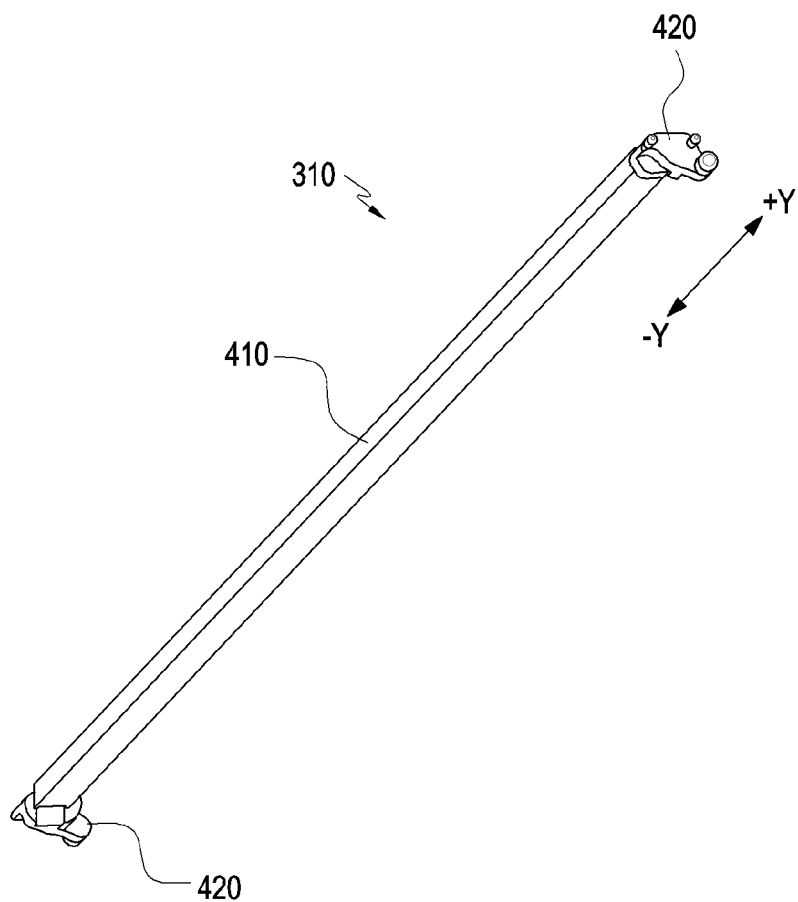
FIG. 9 is a perspective view illustrating one bar of a supporting structure according to various embodiments.

FIG. 9 is a perspective view illustrating a bar of a supporting structure according to various embodiments.

Figure 10:
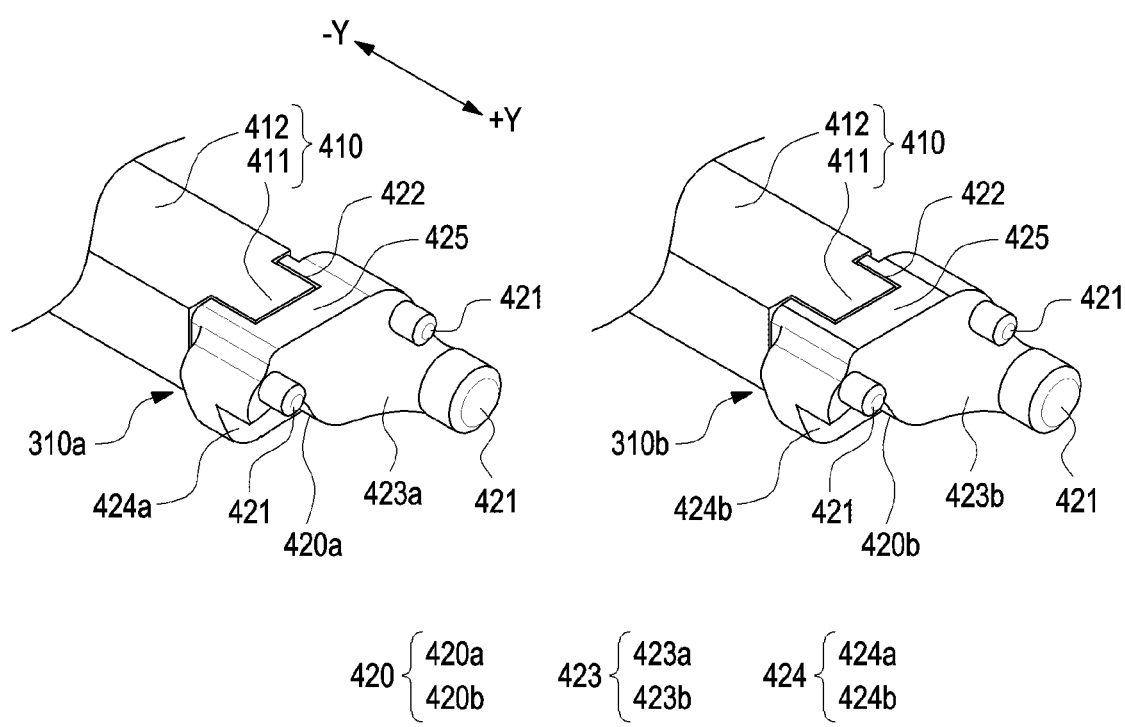
FIG. 10 is an enlarged perspective view illustrating a portion of bars disposed adjacent to each other in a supporting structure according to various embodiments.

FIG. 10 is an enlarged perspective view illustrating a portion of bars disposed adjacent to each other in a supporting structure according to various embodiments.

Figure 11:
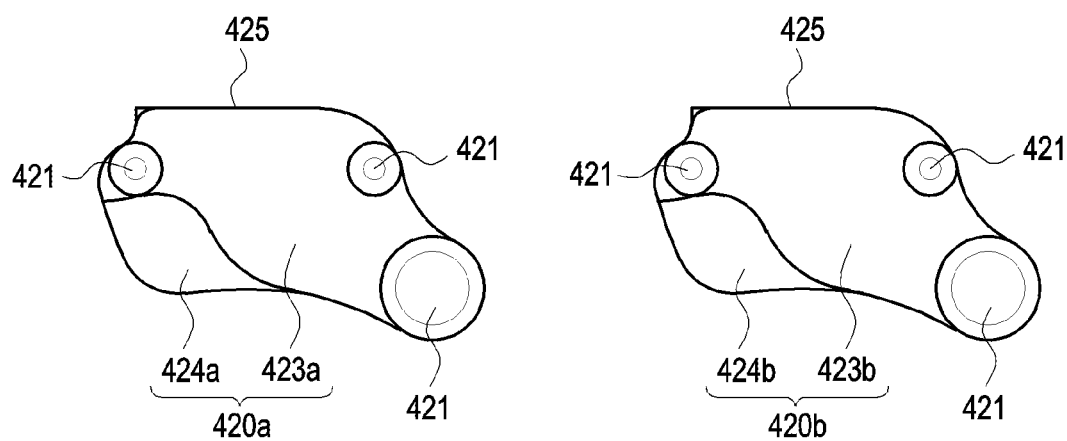
FIG. 11 is a view illustrating a header portion among portions of bars disposed adjacent to each other in a supporting structure according to various embodiments.

FIG. 11 is a view illustrating a header portion among portions of bars disposed adjacent to each other in a supporting structure according to various embodiments.

According to various embodiments, the electronic device 101 may include a display (e.g., the display 203 of FIG. 4) and a supporting structure 300 that supports bending (or rolling) of the display 203. The configuration of the supporting structure 300 disclosed in FIGS. 9, 10, and 11 may be identical in whole or part to the configuration of the supporting structure 300 of FIGS. 5, 6, 7, and 8.

According to various embodiments, the supporting structure 300 may include a plurality of bars 310. Each of the plurality of bars 310 may include a frame 410 and a header 420 disposed on an end of the frame 410. The header 420 may be disposed on one or each of two opposite ends of the frame 410 to guide movement of the bar 310 and prevent/reduce rotation of the bar 310 by a designated angle or more.

According to various embodiments, the frame 410 may overall have a rectangular pole shape (rod shape) and may include a first coupling portion 411 for coupling with the header 420 and a first supporting surface 412 on at least one end thereof. The first coupling portion 411 may be formed on each of two opposite ends of the frame 410 and protrude outward (e.g., the +Y-axis direction and/or −Y-axis direction). Two heads 420 may be coupled to each first coupling portion 411. However, rather than individually prepared and assembled, the frame 410 and the header 420 may be integrally manufactured. The first supporting surface 412 is a surface to overall support the display 203 and may be formed to be substantially flat.

According to various embodiments, the header 420 may include a second coupling portion 422 for coupling with the first coupling portion 411 of the frame 410, a protrusion 423 formed on the opposite surface of the second coupling portion 422, a seating portion 424 where the protrusion of the adjacent header is seatable, and a second supporting surface 425 for supporting the display 203. The header 420 may further include a plurality of poles 421 formed on the outer surface of the protrusion 423. The second coupling portion 422 may be male-and-female coupled to the first coupling portion 411. For example, when the first coupling portion 411 has a convex shape, the second coupling portion 422 may have a concave shape. As another example, when the first coupling portion 411 has a concave shape, the second coupling portion 422 may have a convex shape.

According to various embodiments, the protrusion 423 of the header 420 is a portion protruding to the adjacent header 420 and may be formed to have a shape corresponding to the seating portion 424 of the adjacent header 420. The seating portion 424 is a portion recessed to seat the protrusion 423 of the adjacent header 420 and may be formed to have a shape corresponding to the protrusion 423 of the adjacent header 420. For example, in the first bar 310a and the second bar 310b adjacent to the first bar 310a, the first header 420a of the first bar 310a may include a first protrusion 423a and a first seating portion 424a, and the second header 420b of the second bar 310b may include a second protrusion 423b and a second seating portion 424b. The first protrusion 423a of the first bar 310a is a portion to be seated on the second seating portion 424b of the second bar 310b and may be formed to have a shape corresponding to the second seating portion 424b.

According to various embodiments, when the display 203 forms a plane, the plurality of bars 310 supporting the plane are spaced apart from each other and, when the display 203 is bent (or rolled), the plurality of bars 310 may contact each other. In this case, the protrusion of each bar (e.g., the first protrusion 423a of the first bar 310a) may be moved while remaining seated on the seating portion of the adjacent bar (e.g., the second seating portion 424b of the second bar 310b).

According to various embodiments, the second supporting surface 425 of the header 420 may be formed to be flat as a surface for supporting the display 203. The second supporting surface 425 of the header 420 may be substantially coplanar with the first supporting surface 412 of the frame 410. The first supporting surface 412 of the frame 410 may support the overall surface of the display 203, and the second supporting surface 425 of the header 420 may support the edge of the display 203.

According to various embodiments, the plurality of poles 421 may have a shape protruding outward (e.g., the +Y-axis direction and/or −Y-axis direction) from the outer surface of the protrusion 423. The plurality of poles 421 may be spaced apart from each other and have a cylindrical shape. For example, the plurality of poles 421 may be at least three poles and be positioned in the edge area of the outer surface of the protrusion 423. According to an embodiment, the plurality of poles 421 may include poles 421 having different sizes (e.g., diameters). For example, there may be two poles 421 facing the display 203 and the two poles 421 may have a first diameter. There may be one pole 421 facing in the opposite direction from the display 203, and the pole 421 may have a second diameter. The first diameter may be smaller than the second diameter. The frame 410, the header 420, and the pole 421 may not only be individually prepared and assembled but also be integrally manufactured.

According to various embodiments, when the plurality of poles 421 of the header 420 slide within the guide rail (e.g., the guide rail 215 of FIG. 4) of the electronic device 101, rotation of the header 420 may be restrained. A relationship between the plurality of poles 421 of the header 420 and the guide rail 215 is described below.

Figure 12:
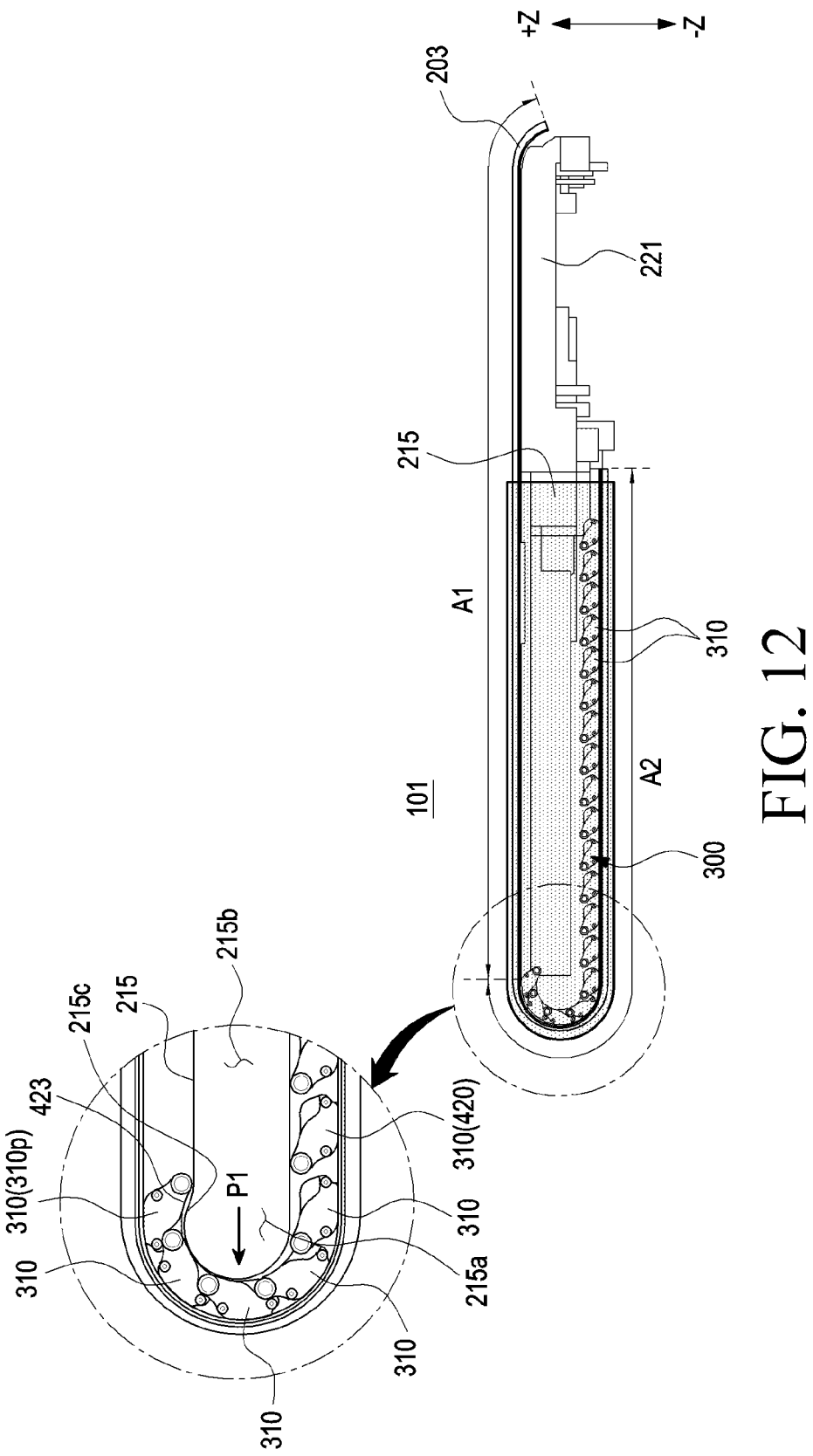
FIG. 12 is a cross-sectional view illustrating an arrangement relationship between a supporting structure and a guide rail in a closed state of an electronic device according to various embodiments.

FIG. 12 is a cross-sectional view illustrating an arrangement relationship between a supporting structure and a guide rail in a closed state of an electronic device according to various embodiments.

Figure 13:
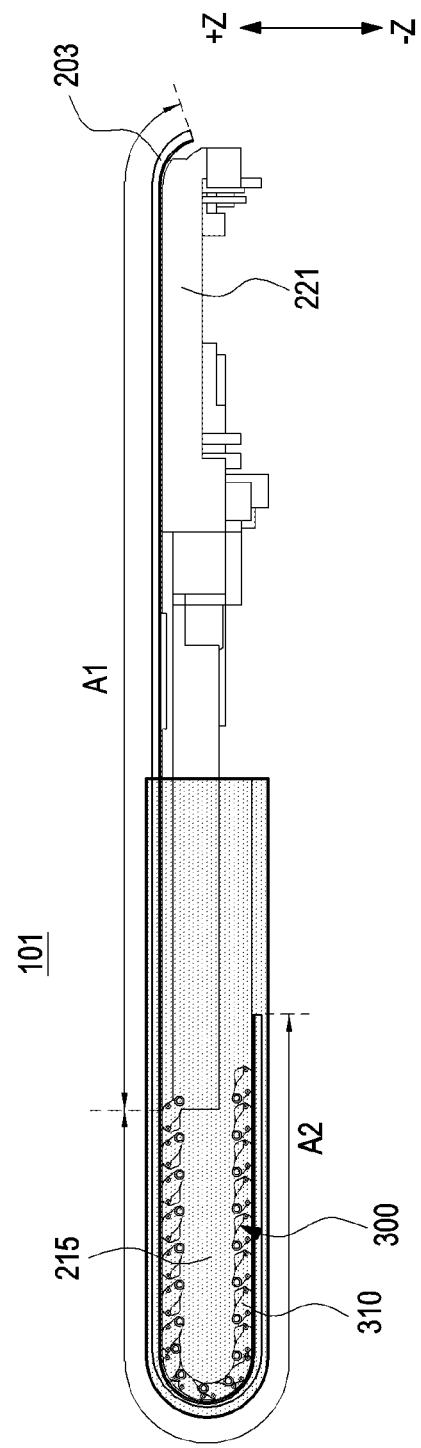
FIG. 13 is a cross-sectional view illustrating an arrangement relationship between a supporting structure and a guide rail in an intermediate state (between the closed state and the opened state) of an electronic device according to various embodiments.

FIG. 13 is a cross-sectional view illustrating an arrangement relationship between a supporting structure and a guide rail in an intermediate state (between the closed state and the opened state) of an electronic device according to various embodiments.

Figure 14:
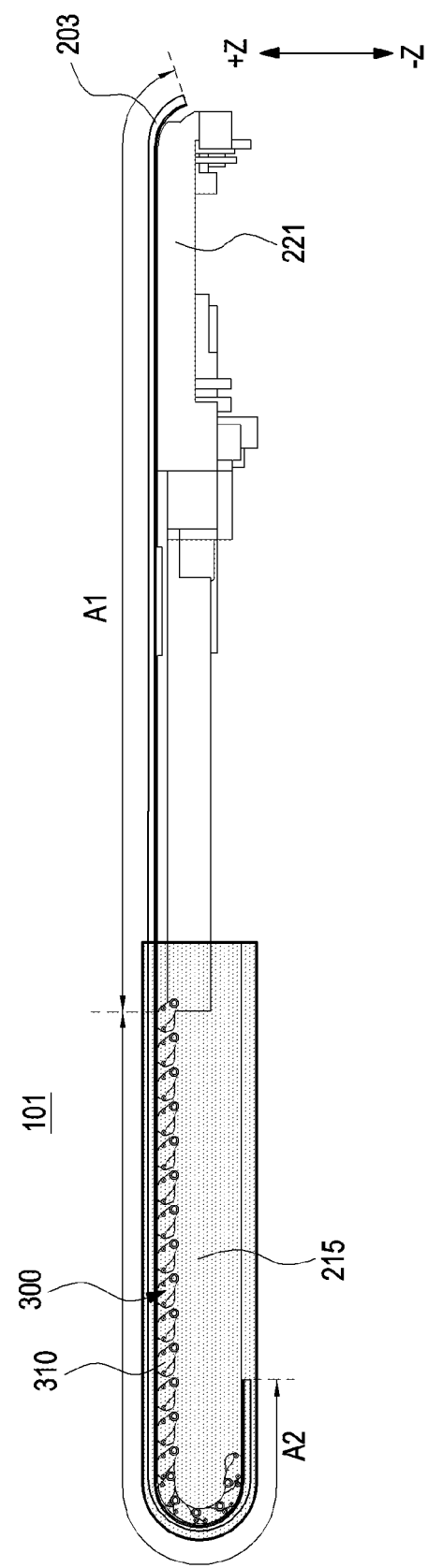
FIG. 14 is a cross-sectional view illustrating an arrangement relationship between a supporting structure and a guide rail in an opened state of an electronic device according to various embodiments.

FIG. 14 is a cross-sectional view illustrating an arrangement relationship between a supporting structure and a guide rail in an opened state of an electronic device according to various embodiments.

Figure 15:
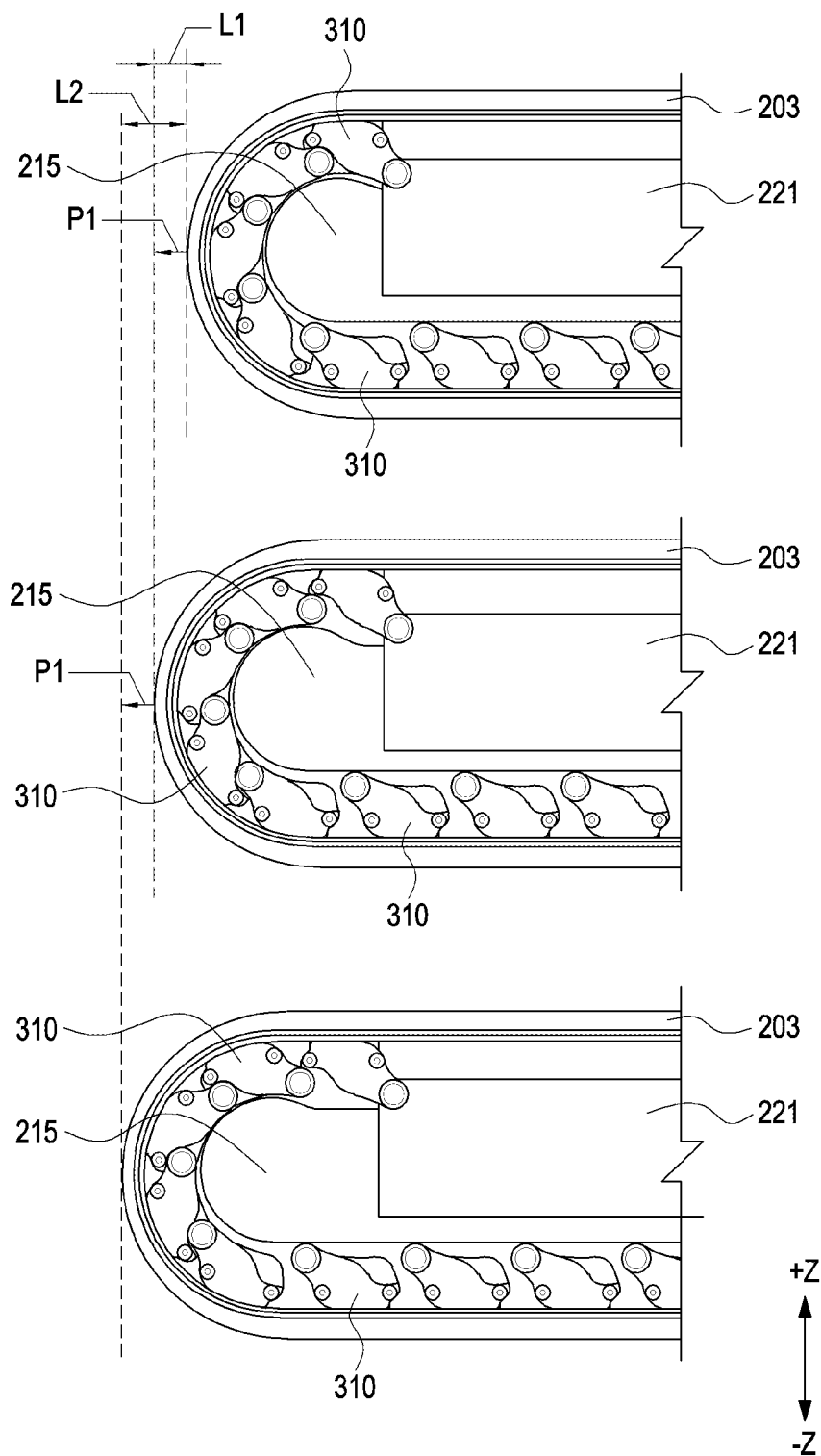
FIG. 15 is a cross-sectional view illustrating various operations from a closed state to an opened state of an electronic device according to various embodiments.

FIG. 15 is a cross-sectional view illustrating various operations from a closed state to opened state of an electronic device according to various embodiments.

Figure 16A:
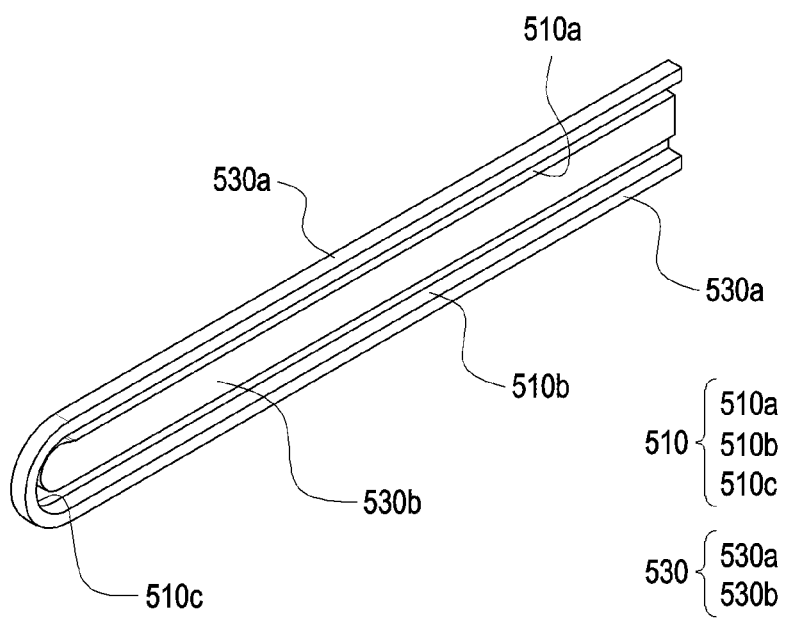
FIGS. 16A, 16B, and 16C are views illustrating a guide rail viewed in various directions according to various embodiments.
Figure 16B:
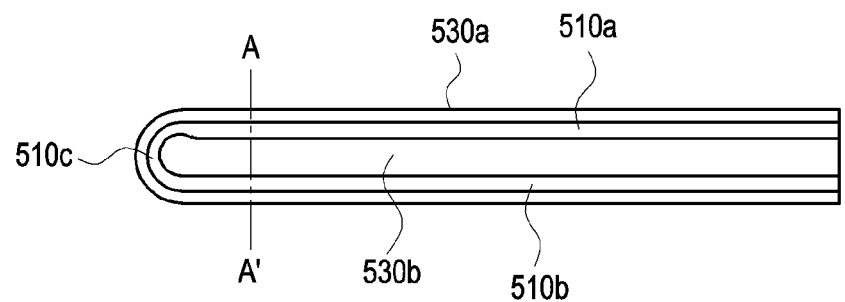
Figure 16C:
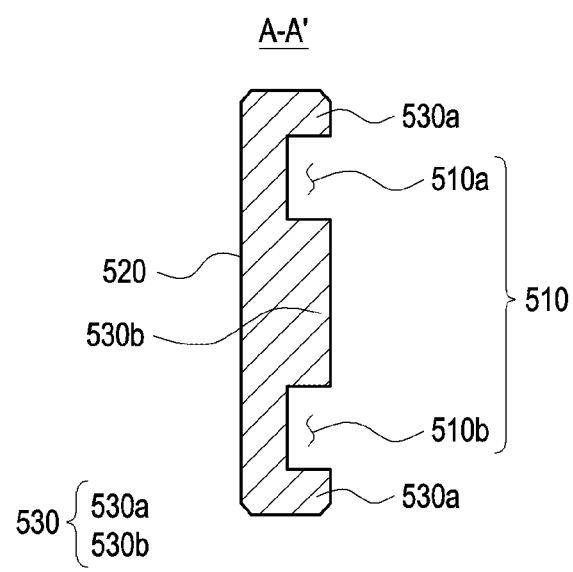

FIGS. 16A, 16B, and 16C are various views illustrating a guide rail viewed in various directions according to various embodiments.

Figure 17:
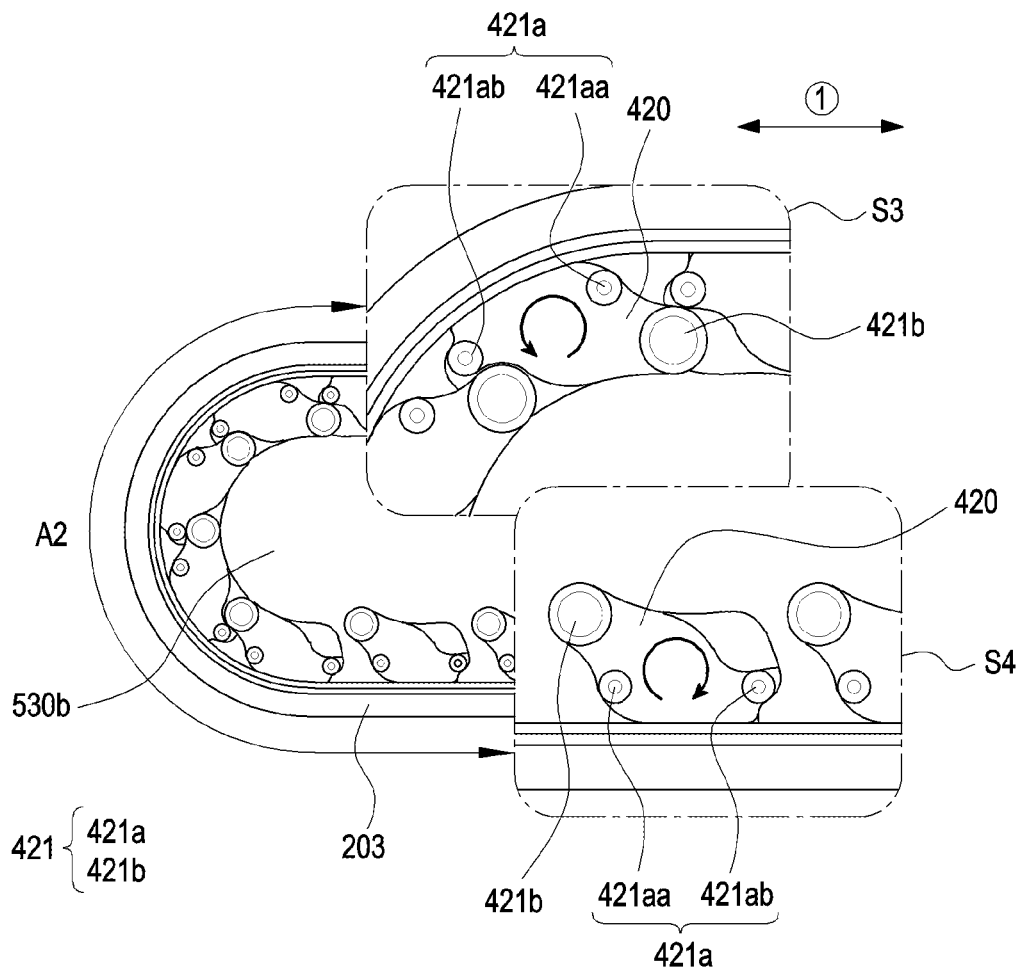
FIG. 17 is a cross-sectional view illustrating a header of a supporting structure disposed in a guide rail according to various embodiments of the disclosure.

FIG. 17 is a cross-sectional view illustrating a header of a supporting structure disposed in a guide rail according to various embodiments.

Figure 18:
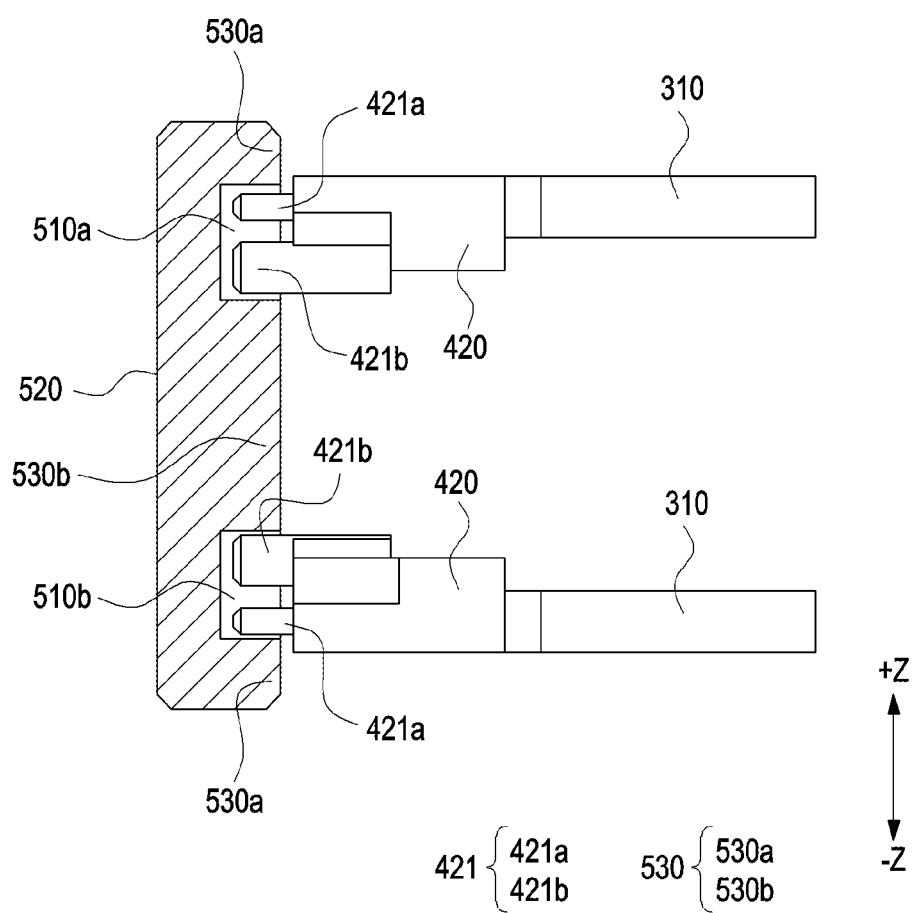
FIG. 18 is a cross-sectional view illustrating a header of a supporting structure disposed in a guide rail according to various embodiments.

FIG. 18 is a cross-sectional view illustrating a header of a supporting structure disposed in a guide rail according to various embodiments.

According to various embodiments, the electronic device 101 may include a second plate 221, a display 203 (e.g., a flexible display), a supporting structure 300 supporting bending (or rolling) of the display 203, and a guide rail 215. The configuration of the second plate 221, the display 203, and the guide rail 215 disclosed in FIGS. 12, 13, 14, 15, 16A, 16B, 16C, 17, and 18 may be identical in whole or part to the configuration of the second plate 221, the display 203, and the guide rail 215 of FIG. 4. The configuration of the supporting structure 300 disclosed in FIGS. 12, 13, 14, 15, 16A, 16B, 16C, 17 and 18 may be identical in whole or part to the configuration of the supporting structure 300 of FIGS. 5, 6, 7, 8, 9, 10, and 11.

Referring to FIGS. 12, 13, 14, and 15, when the display (e.g., the display 203 of FIG. 4) operates from the slide-in to slide-out state, the supporting structure 300 supporting the display 203 may slide while supporting the flat area and bending area of the display. The guide rail 215 guiding the supporting structure 300 may also slide outwards (e.g., direction P1).

According to various embodiments, the supporting structure 300 may include a plurality of bars 310. Each of the plurality of bars 310 may include a frame (e.g., the frame 410 of FIG. 9) and a header 420 disposed on an end of the frame. The header 420 may be disposed on one or each of two opposite ends of the frame 410 to guide movement of the bar 310 and prevent/reduce rotation of the bar 310 by a designated angle or more.

According to various embodiments, the plurality of bars 310 of the supporting structure 300 may substantially support the second display area (e.g., the second display area A2 of FIG. 4) of the display 203. For example, in the operation of the display 203 from the slide-in state to the slide-out state, some of the plurality of bars 310 may support the bending area of the second display area, and others of the plurality of bars 310 may support a flat area. As the second display area A2 changes from the bending area to the flat area or from the flat area to the bending area, the plurality of bars 310 may also change to correspond to the shape of the second display area A2.

According to various embodiments, the guide rail 215 may overall cover the plurality of bars 310 of the supporting structure 300 when viewed from the outside. For example, the guide rail 215 may have a recess-shaped rail (e.g., the lanes 510 of FIGS. 16A to 16C) formed therein, and the plurality of bars 310 may move along the rail 510. In the operation of the display 203 from the slide-in state to the slide-out state, the plurality of bars 310 may slide outwards along with the guide rail 215 while moving from the rear direction of the electronic device (e.g., the −Z-axis direction) to the front direction (e.g., the +Z-axis direction) to expose or make visible the second display area A2 to the outside. For example, in the slide-out operation of the display 203, a second anti-rotation wall 530b of the guide rail 215 may be operated while pushing out at least some bent bars of the plurality of bars 310.

According to various embodiments, the guide rail 215 may include a semicircular portion 215a for bending the plurality of bars 310 and a rod-shape portion 215b for sliding the plurality of bars 310 to the left and right. At least a portion of the guide rail 215 may be manufactured to correspond to the shape of the plurality of bars 310. For example, a recess portion 215c concave inward to correspond to the shape of the protrusion of the outermost bar 310 of the plurality of bars 310 may be formed at the boundary between the semicircular portion 215a and the rod-shaped portion 215b. In the slide-in state of the display, at least a portion of the protrusion 423 of the outermost bar 310p may be positioned at the recess portion 215c. According to an embodiment, the guide rail 215 may include a plurality of curvatures. For example, the recess portion 215c and the semicircular portion 215a adjacent to the recess portion 215c may form different curvatures. At least a portion of the recess portion 215c may form a curvature facing in the opposite direction (e.g., concave) from the display 203 in the front direction (e.g., the +Z-axis direction), and the semicircular portion 215a adjacent to the recess portion 215c may form a curvature (e.g., concave) corresponding to the display in the front direction (e.g., the +Z-axis direction).

FIG. 15 sequentially illustrates an initial entry state for operation of the display 203 from the slide-in state to the slide-out state. An end (e.g., the semicircular portion 215a of FIG. 12) of the guide rail 215 may extend the display 203 while pushing the plurality of bars 310 bent. For example, the plurality of bars 310 bent may slide outward (e.g., direction P1), extending the display 203 outwards (e.g., direction P1) sequentially by distance L1 and distance L2. According to an embodiment, the plurality of bars 310 may move from the rear direction (e.g., the −Z-axis direction) of the electronic device to the front direction (e.g., the +Z-axis direction) to expose or make visible an area (e.g., the second display area A2 of FIG. 12) of the display 203 to the outside. In this operation, the plurality of bars 310 may turn into a spaced state, a contacting state, and a spaced state. For example, the plurality of bars 310 may be bent and remain in contact while being aligned in parallel to face in the rear direction and then turn into a state in which they are aligned in parallel to face in the front direction. Referring to FIGS. 16A, 16B, and 16C, the guide rail 215 may include a cover portion 520 for covering a portion (e.g., the supporting structure 300) of the electronic device 101, a rail 510 formed to be concave inwards, and an anti-rotation wall 530 formed along the edge of the rail 510.

According to various embodiments, the cover portion 520 may cover the plurality of bars 310 not to be exposed or be visible to the outside and support them so that the rail 510 and the anti-rotation wall 530 are formed on the inner surface. According to an embodiment, the rail 510 may include an upper rail 510a, a bending rail 510c, and a lower rail 510b. The upper rail 510a and the lower rail 510b may be disposed in parallel with each other and guide linear reciprocating slide (e.g., direction ①) of the plurality of bars 310. The upper rail 510a may be an area that is moved along with the plurality of bars 310 so that the second display area A2 of the display 203 may be exposed or visible to the front surface (e.g., the outside). The lower rail 510b may be an area that is moved along with the plurality of bars 310 so that the second display area A2 of the display 203 comes into the inside of the electronic device 101 and is thus hidden. The bending rail 510c may be a curved area extending from the upper rail 510a to the lower rail 510b and guide the plurality of bars 310 to be slidingly rotated.

According to various embodiments, the anti-rotation walls 530 may be portions protruding from the inner surface of the cover portion 520 to the inside of the electronic device 101 and be disposed in parallel on two opposite side surfaces of the rail 510 along the rail 510. The anti-rotation walls 530 may include a first anti-rotation wall 530a disposed along the outer edge of the guide rail 215 and a second anti-rotation wall 530b formed on an inner portion of the guide rail 215. At least portions of the first anti-rotation wall 530a and the second anti-rotation wall 530b may be disposed in parallel with each other. For example, the first anti-rotation wall 530a and the second anti-rotation wall 530b may include a semicircular portion and a rod-shaped portion to correspond to the overall shape of the guide rail 215.

According to various embodiments, the anti-rotation walls 530 may prevent/reduce rotation of each of the plurality of bars 310. Referring to FIGS. 17 and 18, as the plurality of bars 310 are slid (e.g., translated and/or rotated) with the plurality of poles 421 of the respective headers 420 of the plurality of bars 310 substantially fitted in the rail 510 of the guide rail 215, the display 203 may be stably slid. At least three poles 421 may be formed in each header 420 and come in contact with the anti-rotation walls 530 to prevent/reduce rotation of each bar 310. According to an embodiment, the plurality of poles 421 of each header 420 may include two first poles 421a (e.g., a 1-1th pole 421aa and a 1-2th pole 421ab) disposed to face outwards (e.g., toward the display 203) and the upper end of the guide rail 215 to be adjacent to the first anti-rotation wall 530a and one second pole 421b disposed to face inwards (e.g., away from the display 203) or the lower end of the guide rail 215 to be adjacent to the second anti-rotation wall 530b. The diameter of the first pole 421a may be smaller than the diameter of the second pole 421b. However, the shape, placement, and/or size of each of the plurality of poles 421 disclosed in the drawings is not limited to the disclosed configuration, and various design changes may be made for a stable sliding of the display 203.

Referring to the enlarged view S3 of the upper end of FIG. 17 and FIG. 18, sliding operation and operation for preventing/reducing rotation of the plurality of poles 421 positioned on the upper rail 510a of the guide rail 215 and/or the bending rail 510c adjacent to the upper rail 510a may be identified. In the operation in which the plurality of bars 310 are moved in the first direction (e.g., direction ①) along with the slide (e.g., from slide-in to slide-out) of the display 203, the stacked layers in the display 203 may generate force in different shear directions. The generated force may generate a rotational moment to rotate the respective headers 420 of the plurality of bars 310 in a first rotational direction (e.g., counterclockwise). To prevent/reduce the rotation of the rotational moment (e.g., to prevent/reduce the stacked display from peeling off), the 1-1th pole 421aa and the 1-2th pole 421ab disposed on each header 420 contact the first anti-rotation wall 530a and apply force. However, rotation in the first rotational direction (e.g., counterclockwise) may be prevented and/or reduced by the first anti-rotation wall 530a while the display 203 may be stably slid.

Referring to the enlarged view S4 of the lower end of FIG. 17 and FIG. 18, sliding operation and operation for preventing/reducing rotation of the plurality of poles 421 positioned on the lower rail 510b of the guide rail 215 and/or the bending rail 510c adjacent to the lower rail 510b may be identified. In the operation in which the plurality of bars 310 are moved in the first direction (e.g., direction ①) along with the slide (e.g., from slide-in to slide-out) of the display 203, the stacked layers in the display 203 may generate force in different shear directions. The generated force may generate a rotational moment to rotate the respective headers 420 of the plurality of bars 310 in a second rotational direction (e.g., clockwise). To prevent and/or reduce the rotation of the rotational moment (e.g., to prevent and/or reduce the stacked display from peeling off), the second pole 421b disposed on each header 420 contact the first anti-rotation wall 530a and apply force. However, rotation in the second rotational direction (e.g., clockwise) may be prevented/reduced by the first anti-rotation wall 530a while the display 203 may be stably slid.

According to various example embodiments of the disclosure, an electronic device (e.g., the electronic device 101 of FIGS. 1 to 4) may comprise: a first housing (e.g., 201 of FIGS. 2 to 4), a second housing (e.g., 202 of FIGS. 2 to 4) configured to change a position relative to the first housing based on relative sliding of the first housing, a flexible display (e.g., 203 of FIGS. 2 to 4) including a first area (e.g., A1 of FIG. 5) and a bendable or rollable second area (e.g., A2 of FIG. 5) extending from the first area, a supporting structure (e.g., 300 of FIGS. 5 and 6) coupled with the flexible display to support at least a portion of the flexible display and including a plurality of bars (e.g., 310 of FIG. 7), and a guide rail (e.g., 215 of FIG. 4) configured to guide a movement of the plurality of bars based on sliding of the first housing. Each of the plurality of bars may include a frame (e.g., 410 of FIG. 9) and a header (e.g., 420 of FIG. 9) formed on an end of the frame. When the second area of the flexible display is bent or rolled, the headers of the at least two or more adjacent bars may be disposed to at least partially overlap each other. Each of the headers may include at least one pole (e.g., 421 of FIG. 10) at least partially received in the guide rail.

According to various example embodiments, the at least two or more adjacent bars of the plurality of bars may include a first bar (e.g., 310a of FIG. 10) and a second bar (e.g., 310b of FIG. 10). When the flexible display is bent or rolled, a protrusion (e.g., 432a of FIG. 10) of the first bar may be positioned on a seating portion of the second bar, so that the first bar and the second bar may be formed to support each other.

According to various example embodiments, based on the flexible display being bendable or rollable, a pole formed on the protrusion of the first bar overlaps the seating portion of the second bar.

According to various example embodiments, a first distance between respective centers of a first bar (e.g., 310a of FIG. 7) and a second bar (e.g., 310b of FIG. 7) adjacent to each other among the plurality of bars may be identical to a second distance between respective centers of a third bar (e.g., 310c of FIG. 7) and a fourth bar (e.g., 310d of FIG. 7) adjacent to each other among the plurality of bars.

According to various example embodiments, the frame may include a first coupling portion (e.g., 411 of FIG. 10) configured to couple with the header and a supporting surface (e.g., 412 of FIG. 10) formed to be flat to support the flexible display.

According to various example embodiments, the header may further include a second coupling portion (e.g., 422 of FIG. 10) configured to couple with the first coupling portion of the frame, a protrusion (e.g., 423 of FIG. 10) formed on an opposite surface of the second coupling portion, and a seating portion (e.g., 424 of FIG. 10) having a shape corresponding to the protrusion.

According to various example embodiments, the at least one pole may have a shape protruding outwards from an outer surface of the protrusion.

According to various example embodiments, the at least one pole may be arranged along an edge of the guide rail and may include at least one first pole (e.g., 421a of FIG. 17) adjacent to an outer side of the guide rail and at least one second pole (e.g., 421b of FIG. 17) adjacent to an inner side of the guide rail.

According to various example embodiments, the at least one first pole may include a 1-1th pole (e.g., 421aa of FIG. 17) and a 1-2th pole (e.g., 421ab of FIG. 17) having a same diameter and spaced apart from each other, and the first pole may be different in diameter from the second pole.

According to various example embodiments, based on a rotational operation of the flexible display, the at least one first pole may be disposed to contact a portion of the guide rail to suppress rotation of the header in a first rotational direction, and the at least one second pole may be disposed to contact another portion of the guide rail to suppress rotation of the header in a second rotational direction opposite to the first rotational direction.

According to various example embodiments, the guide rail may surround at least a portion of the header of each of the plurality of bars.

According to various example embodiments, the guide rail may include a cover (e.g., 520 of FIG. 16C) configured to cover the supporting structure, a rail (e.g., 510 of FIG. 16C) formed to be concave inwards, and an anti-rotation wall (e.g., 530 of FIG. 16C) formed along an edge of the rail.

According to various example embodiments, the rail may include an upper rail (e.g., 510a of FIG. 16B) and a lower rail (e.g., 510b of FIG. 16B) disposed in parallel with each other and configured to guide a linear reciprocating slide of the plurality of bars and a bending rail (e.g., 510c of FIG. 16B) including a curved area extending from the upper rail to the lower rail configured to guide sliding rotation of the plurality of bars.

According to various example embodiments, the anti-rotation wall may include a first anti-rotation wall (e.g., 530a of FIG. 16C) and a second anti-rotation wall (e.g., 530b of FIG. 16C) disposed in parallel with each other along the rail. The first anti-rotation wall may be disposed along an outer edge of the guide rail and the second anti-rotation wall is formed on an inner portion of the guide rail.

According to various example embodiments, based on a slide-out operation of the display, at least one first pole among the plurality of poles positioned on the upper rail of the guide rail or the bending rail adjacent to the upper rail and adjacent to the first anti-rotation wall may be configured to guide sliding of the flexible display as rotation in a first rotational direction is suppressed by the first anti-rotation wall.

According to various example embodiments, based on a slide-out operation of the flexible display, at least one second pole among the plurality of poles positioned on the lower rail of the guide rail or the bending rail adjacent to the lower rail and adjacent to the second anti-rotation wall may be configured to guide sliding of the flexible display as rotation in a second rotational direction opposite to the first rotational direction is suppressed by the second anti-rotation wall.

According to various example embodiments, based on a slide-out operation of the flexible display, the second anti-rotation wall of the guide rail may be configured to operate while pushing out at least some bent bars of the plurality of bars.

According to various example embodiments of the disclosure, an electronic device (e.g., the electronic device 101 of FIGS. 1 to 4) may comprise: a first housing (e.g., 201 of FIGS. 2 to 4), a second housing (e.g., 202 of FIGS. 2 to 4) receiving at least a portion of the first housing and configured to guide sliding of the first housing, a flexible display (e.g., 203 of FIGS. 2 to 4) including a first area (e.g., A1 of FIG. 5) and a bendable or rollable second area (e.g., A2 of FIG. 5) extending from the first area, a supporting structure (e.g., 300 of FIGS. 5 and 6) supporting at least a portion of the flexible display and including a plurality of bars (e.g., FIG. 16C) whose relative position is changed based on the bending or rolling, and a guide rail (e.g., 215 of FIG. 4) configured to guide a slide of the plurality of bars and surrounding at least some of the plurality of bars. When the flexible display is bent or rolled, adjacent bars among the plurality of bars of the supporting structure may be disposed to at least partially overlap and support each other. The plurality of bars may include a plurality of poles (e.g., 421 of FIG. 10) sliding along the guide rail to suppress rotation of each bar.

According to various example embodiments, each of the plurality of bars of the supporting structure may include a frame and a header formed on an end of the frame, and wherein the header includes, a coupling portion configured to couple with the frame, a protrusion formed on an opposite surface of the coupling portion, and a seating portion having a shape corresponding to the protrusion.

According to various example embodiments, the plurality of poles may have a shape protruding outwards from an outer surface of the protrusion of the header.

According to various example embodiments, the guide rail may include a cover portion configured to at least partially cover the supporting structure, a rail formed to be concave inwards, and an anti-rotation wall formed along an edge of the rail.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing;
a second housing configured to change a position relative to the first housing;
a flexible display including a first area and a bendable second area extending from the first area;
a supporting structure, comprising a support, coupled with the flexible display to support at least a portion of the flexible display and including a plurality of bars; and
a guide rail configured to guide a movement of the plurality of bars,
wherein each of the plurality of bars includes a frame and a header formed proximate an end of the frame,
wherein based on the second area of the flexible display being bent, headers of at least two or more adjacent of the bars are disposed to at least partially overlap each other, and
wherein at least a portion of the second area of the flexible display is configured to be moved between a bending range and a flat range,
wherein each of the headers includes a first pole and a second pole spaced apart from each other, and at least partially received in the guide rail, and
wherein the first pole and the second pole are configured to reduce a rotational moment generated in the bar corresponding to the first pole and the second pole when the bar corresponding to the first pole and the second pole is positioned at the bending range.

2. The electronic device of claim 1, wherein the at least two or more adjacent bars of the plurality of bars include a first bar and a second bar, and
wherein based on the flexible display being bent, a protrusion of the first bar is positioned on a seating portion of the second bar, so that the first bar and the second bar support each other.

3. The electronic device of claim 2, wherein based on the flexible display being bent, the second pole is formed on the protrusion of the first bar and overlaps the seating portion of the second bar.

4. An electronic device comprising:
a first housing;
a second housing configured to change a position relative to the first housing;
a flexible display including a first area and a bendable second area extending from the first area;
a supporting structure, comprising a support, supporting at least a portion of the flexible display and including a plurality of bars whose relative position is configured to change based on the bending; and
a guide rail configured to guide sliding of the plurality of bars and to surround at least some of the plurality of bars,
wherein based on the flexible display being bent, adjacent bars among the plurality of bars of the supporting structure are disposed to at least partially overlap and support each other,
wherein at least a portion of the second area of the flexible display is configured to be moved between a bending range and a flat range,
wherein the plurality of bars each includes a first pole and a second pole on at least one end thereof that are spaced from each other, and configured to slide along the guide rail to suppress rotation of each bar, and
wherein the first pole and the second pole are configured to reduce a rotational moment generated in the bar corresponding the first pole and the second pole when the bar corresponding to the first pole and the second pole is positioned at the bending range.

5. The electronic device of claim 4, wherein each of the plurality of bars of the supporting structure includes a frame and a header formed on an end of the frame, and wherein the header includes,
a coupling portion configured to couple with the frame;
a protrusion formed on an opposite surface of the coupling portion; and
a seating portion having a shape corresponding to the protrusion.

6. An electronic device comprising:
a first housing;
a second housing slidably disposed on the first housing;
a flexible display including a first area and a second area extending from the first area;
a supporting structure, comprising a support, coupled with the flexible display, configured to support at least a portion of the flexible display and including a plurality of bars; and
a guide rail configured to guide a movement of the plurality of bars,
wherein each of the plurality of bars includes a frame and a header formed on an end of the frame,
wherein each of the headers includes at least one pole partially received in the guide rail, and
wherein the headers of at least two or more adjacent bars of the plurality of bars are configured to partially overlap and support each other at a first position corresponding to a bent area of the second area, and are configured to be spaced apart from each other at a second position corresponding to a flat area of the second area.

7. The electronic device of claim 6, wherein the at least two or more adjacent bars of the plurality of bars include a first bar and a second bar, and
a protrusion of the first bar is configured to be positioned on a seating portion of the second bar, so that the first bar and the second bar support each other at the first position corresponding to the bent area.

8. The electronic device of claim 7, wherein a second pole is formed on the protrusion of the first bar and is configured to overlap the seating portion of the second bar.

9. The electronic device of claim 6, wherein a first distance between respective centers of a first bar and a second bar adjacent to each other among the plurality of bars at the first position corresponding to the bent area is identical to a second distance between respective centers of a third bar and a fourth bar adjacent to each other among the plurality of bars at the second position corresponding to the flat area.

10. The electronic device of claim 6, wherein the frame includes,
   a first coupling portion configured to couple with the header; and
   a flat supporting surface configured support the flexible display.

11. The electronic device of claim 10, wherein the header further includes,
   a second coupling portion configured to couple with the first coupling portion of the frame;
   a protrusion formed on an opposite surface of the second coupling portion; and
   a seating portion having a shape corresponding to the protrusion.

12. The electronic device of claim 11, wherein a first pole and a second pole of the plurality of bars have a shape protruding outwards from an outer surface of the protrusion, respectively.

13. The electronic device of claim 6, wherein a first pole and a second pole of the plurality of bars are arranged along an edge of the guide rail, wherein the first pole is adjacent to an outer side of the guide rail, and wherein the second pole is adjacent to an inner side of the guide rail.

14. The electronic device of claim 13, wherein the first pole includes a first first pole and a second first pole identical in diameter and spaced apart from each other, and
   the first first pole and the second first pole are different in diameter from the second pole.

15. The electronic device of claim 13, wherein
   the first pole is configured to contact a portion of the guide rail to suppress rotation of the header in a first rotational direction when flexible display performs an operation from a slide-in state to a slide-out state, and
   the second pole is configured to contact another portion of the guide rail to suppress rotation of the header in a second rotational direction opposite to the first rotational direction when flexible display performs the operation from the slide-in state to the slide-out state.

16. The electronic device of claim 6, wherein the guide rail is formed to surround at least a portion of the header of each of the plurality of bars.

17. The electronic device of claim 6, wherein the guide rail includes,
   a cover portion configured to cover the supporting structure;
   a rail formed to be concave inwards; and
   an anti-rotation wall formed along an edge of the rail.

18. The electronic device of claim 17, wherein the rail includes an upper rail and a lower rail disposed in parallel with each other configured to guide a linear reciprocating slide of the plurality of bars and a bending rail comprising a curved area extending from the upper rail to the lower rail configured to guide sliding rotation of the plurality of bars.

19. The electronic device of claim 18, wherein the anti-rotation wall includes a first anti-rotation wall and a second anti-rotation wall disposed in parallel with each other along the rail, and wherein the first anti-rotation wall is disposed along an outer edge of the guide rail and the second anti-rotation wall is formed on an inner portion of the guide rail.

20. The electronic device of claim 19, wherein the at least one pole comprises a first pole positioned on the upper rail of the guide rail or the bending rail adjacent to the upper rail and adjacent to the first anti-rotation wall that is configured to guide a slide of the flexible display as rotation in a first rotational direction is suppressed by the first anti-rotation wall when the flexible display performs an operation from a slide-in state to a slide- out state, and
   a second pole positioned on the lower rail of the guide rail or the bending rail adjacent to the lower rail and adjacent to the second anti-rotation wall that is configured to guide a slide of the flexible display as rotation in a second rotational direction opposite to the first rotational direction is suppressed by the second anti-rotation wall when the flexible display performs an operation from a slide-in state to a slide-out state.

* * * * *